United States Patent
Yoon et al.

(10) Patent No.: US 9,583,266 B2
(45) Date of Patent: Feb. 28, 2017

(54) DIELECTRIC CERAMIC COMPOSITION, DIELECTRIC MATERIAL AND MULTILAYER CERAMIC CAPACITOR INCLUDING THE SAME

(71) Applicant: SAMSUNG ELECTRO-MECHANICS CO., LTD., Suwon-Si, Gyeonggi-Do (KR)

(72) Inventors: Seok Hyun Yoon, Suwon-Si (KR); Yun Jung Park, Suwon-Si (KR); Doo Young Kim, Suwon-Si (KR); Song Je Jeon, Suwon-Si (KR); Chang Hoon Kim, Suwon-Si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/699,805

(22) Filed: Apr. 29, 2015

(65) Prior Publication Data

US 2016/0172107 A1    Jun. 16, 2016

(30) Foreign Application Priority Data

Dec. 16, 2014    (KR) .......................... 10-2014-0181804

(51) Int. Cl.
| | | |
|---|---|---|
| C04B 35/00 | (2006.01) | |
| H01G 4/30 | (2006.01) | |
| C04B 35/468 | (2006.01) | |
| H01G 4/12 | (2006.01) | |

(52) U.S. Cl.
CPC ........... *H01G 4/30* (2013.01); *C04B 35/4682* (2013.01); *H01G 4/1227* (2013.01)

(58) Field of Classification Search
CPC C04B 35/468; C04B 35/4682; H01G 4/1227; H01G 4/1218; H01G 4/1209
USPC .................................................. 501/137, 138
See application file for complete search history.

(56) References Cited

U.S. PATENT DOCUMENTS

| | | | | |
|---|---|---|---|---|
| 7,057,876 | B2* | 6/2006 | Fujioka | ................... B32B 18/00 361/321.4 |
| 7,706,125 | B2* | 4/2010 | Fukuda | ................ H01G 4/1227 29/25.42 |
| 8,154,851 | B2* | 4/2012 | Fukuda | ............... C04B 35/4682 361/321.4 |
| 8,184,427 | B2* | 5/2012 | Yamazaki | ............... B32B 18/00 361/321.4 |
| 8,208,240 | B2* | 6/2012 | Yamazaki | ............ H01G 4/1227 361/321.4 |

FOREIGN PATENT DOCUMENTS

KR    10-1999-0075846 A    3/2000

* cited by examiner

*Primary Examiner* — Noah Wiese
(74) *Attorney, Agent, or Firm* — McDermott Will & Emery LLP

(57) ABSTRACT

There is provided a dielectric ceramic composition including: a major component (a barium titanate-based base material); and a minor component, wherein the dielectric ceramic composition is sintered to form a sintered body having a fine structure, the fine structure includes first crystal grains in which a Ca content is lower than 2.5 mol % and second crystal grains in which a Ca content is between 2.5 mol % to 13.5 mol %, and the second crystal grains have a cross-sectional area ratio of 30% to 80% on the basis of 100% of an overall cross-sectional area of the fine structure.

21 Claims, 2 Drawing Sheets

A – A'

DIELECTRIC CERAMIC COMPOSITION, DIELECTRIC MATERIAL AND MULTILAYER CERAMIC CAPACITOR INCLUDING THE SAME

CROSS-REFERENCE TO RELATED APPLICATION

This application claims the priority and benefit of Korean Patent Application No. 10-2014-0181804 filed on Dec. 16, 2014, with the Korean Intellectual Property Office, the disclosure of which is incorporated herein by reference.

BACKGROUND

The present disclosure relates to a dielectric ceramic composition having guaranteed X8R temperature characteristics and reliability, a dielectric material, and a multilayer ceramic capacitor including the same.

Electronic components using ceramic materials, such as capacitors, inductors, piezoelectric elements, varistors, and thermistors, include a ceramic body formed of ceramic materials, internal electrodes formed in the ceramic body, and external electrodes formed on a surface of the ceramic body to be connected to the internal electrodes.

Among ceramic electronic components, multilayer ceramic capacitors include a plurality of stacked dielectric layers, internal electrodes disposed to face each other, having at least one of the dielectric layers interposed therebetween, and external electrodes electrically connected to the internal electrodes.

Multilayer ceramic capacitors are generally manufactured by printing a paste for internal electrodes on sheets formed of a paste for dielectric layers, stacking the sheets and sintering the same.

Dielectric materials used in existing multilayer ceramic capacitors having high capacitance, and the like, are commonly barium titanate ($BaTiO_3$)-based ferroelectric materials which have high dielectric constants at room temperature, a relatively low dissipation factor, and excellent insulation resistance properties.

However, the use of such barium titanate ($BaTiO_3$)-based ferroelectric materials may be problematic in terms of satisfying X8R characteristics and obtaining guaranteed reliability.

RELATED ART DOCUMENT (Patent Document 1) Korean Patent Laid-Open Publication No. 1999-0075846

SUMMARY

An aspect of the present disclosure may provide a novel dielectric ceramic composition having guaranteed X8R temperature characteristics and reliability, a dielectric material, and a multilayer ceramic capacitor including the same.

According to an aspect of the present disclosure, there are provided a dielectric ceramic composition including: a major component (a barium titanate-based base material); and a minor component, wherein the dielectric ceramic composition is sintered to form a sintered body having a fine structure, the fine structure includes first crystal grains in which a Ca content is lower than 2.5 mol % and second crystal grains in which a Ca content is between 2.5 mol % to 13.5 mol %, and the second crystal grains have a cross-sectional area ratio of 30% to 80% on the basis of 100% of an overall cross-sectional area of the fine structure, and a dielectric material obtained by sintering the dielectric ceramic composition.

According to another aspect of the present disclosure, a multilayer ceramic capacitor may include: a ceramic body in which dielectric layers and first and second internal electrodes are alternately stacked; and first and second external electrodes disposed on external surfaces of the ceramic body and electrically connected to the first and second internal electrodes, wherein the dielectric layers have a fine structure including first crystal grains in which a Ca content is lower than 2.5 mol % and second crystal grains in which a Ca content is between 2.5 mol % to 13.5 mol %, the second crystal grains have a cross-sectional area ratio of 30% to 80% on the basis of 100% of the overall cross-sectional area of the fine structure.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Figure 1:
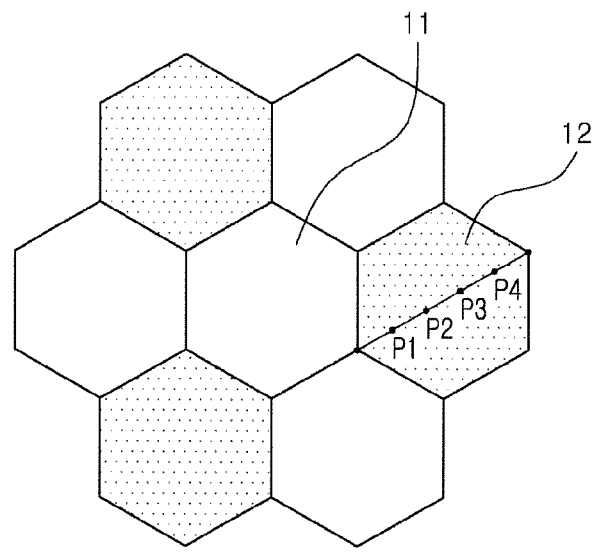
FIG. 1 is a schematic diagram of a fine structure obtained after sintering a dielectric ceramic composition according to an exemplary embodiment in the present disclosure.

Exemplary embodiments of the present disclosure will now be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

The present inventive concept relates to a dielectric ceramic composition, and examples of electronic components including the dielectric ceramic composition include capacitors, inductors, piezoelectric elements, varistors, and thermistors. Hereinafter, a dielectric ceramic composition and a multilayer ceramic capacitor including the same as an example of the electronic components will be described in exemplary embodiments.

A dielectric ceramic composition according to exemplary embodiments may include: a major component (a base material); and a minor component, wherein the dielectric ceramic composition is sintered to form a sintered body having a fine structure, the fine structure includes crystal grains in which a Ca content is lower than 2.5 mol % and crystal grains in which a Ca content is between 2.5 mol % to 13.5 mol %, and the second crystal grains have a cross-sectional area ratio of 30% to 80% on the basis of 100% of the overall cross-sectional area of the fine structure.

The major component may be a barium titanate-based compound including Ba and Ti.

In an XRD analysis of the sintered body obtained by sintering the dielectric ceramic composition according to exemplary embodiments, when a (110) peak of $BaTiO_3$ is set as 1.00, a ratio of a peak of a pyrochlore ($RE_2Ti_2O_7$) at an angle of diffraction (2θ) of about 30.5 degrees with respect to the (110) peak of $BaTiO_3$ may satisfy 0.02 or less, where RE is at least one of Y, Dy, Ho, Sm, Gd, Er, La, Ce, Nd, Pr, and Tb.

The dielectric ceramic composition according to exemplary embodiments may satisfy X5R (−55° C. to 85° C.), X7R (−55° C. to 125° C.), and X8R (−55° C. to 150° C.) characteristics defined by the Electronic Industries Association (EIA) standard.

In addition, by adjusting relative intensity of the pyrochlore phase in an XRD analysis, a dielectric ceramic composition, a dielectric material, and a multilayer ceramic capacitor including the same, may obtain excellent reliability.

According to exemplary embodiments, nickel (Ni) may be used as internal electrodes and a dielectric ceramic composition may be sintered under a reducing atmosphere in which nickel (Ni) is not oxidized, at a temperature of 1300° C. or lower.

In addition, according to exemplary embodiments, a dielectric material may be formed by sintering the dielectric ceramic composition, and a multilayer ceramic capacitor may be formed using the dielectric ceramic composition.

The multilayer ceramic capacitor according to exemplary embodiments may satisfy the above-described temperature characteristics and may have excellent reliability.

FIG. 1 is a schematic diagram of a fine structure obtained after sintering a dielectric ceramic composition according to an exemplary embodiment in the present disclosure.

The dielectric material obtained by sintering the dielectric ceramic composition according to an exemplary embodiment may include a plurality of dielectric grains as shown in FIG. 1.

Referring to FIG. 1, the dielectric ceramic composition may be sintered to form a sintered body having a fine structure, the fine structure may include first crystal grains 11 in which a Ca content is lower than 2.5 mol % and second crystal grains 22 in which a Ca content is between 2.5 mol % to 13.5 mol %, and the second crystal grains may have a cross-sectional area ratio of 30% to 80% on the basis of 100% of the overall cross-sectional area of the fine structure.

The Ca content in each crystal grain may be measured through scanning transmission electron microscopy-energy dispersive x-ray spectroscopy (STEM-EDS) analysis.

In the sintered body of the dielectric ceramic composition according to the exemplary embodiment, the Ca content in a single crystal grain may be determined as an average of values measured at positions P1, P2, P3, and P4 of the corresponding crystal grain as shown in FIG. 1.

P1, P2, P3, and P4 may be defined by 1/5, 2/5, 3/5, 4/5 points on a conceptual straight line traversing the corresponding crystal grain, respectively.

Figure 2:
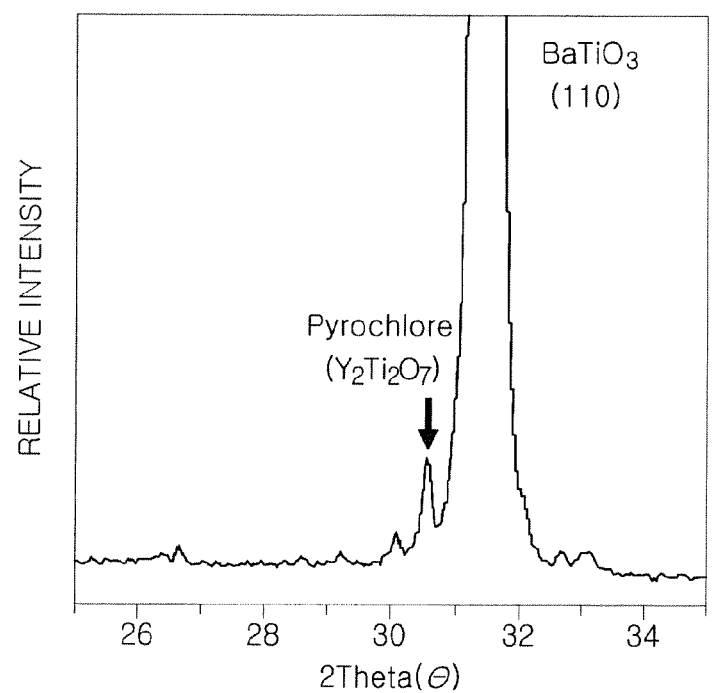
FIG. 2 is an X-ray diffraction (XRD) graph after sintering the dielectric ceramic composition according to an exemplary embodiment in the present disclosure.

FIG. 2 is an X-ray diffraction (XRD) graph after sintering the dielectric ceramic composition according to an exemplary embodiment in the present disclosure.

Referring to FIG. 2, in an XRD analysis of the sintered body according to the exemplary embodiment, when a (110) peak of $BaTiO_3$ is set as 1.00, a ratio of a peak of a pyrochlore phase ($RE_2Ti_2O_7$) at about 30.5 degrees with respect to the (110) peak of $BaTiO_3$ may satisfy 0.02 or less, where RE is at least one of Y, Dy, Ho, Sm, Gd, Er, La, Ce, Nd, Pr, and Tb.

In particular, referring to FIG. 2, the pyrochlore phase may be $Y_2Ti_2O_7$.

When barium titanate having Ca in a solid-solution form mixed therewith, that is, barium calcium titanate (BCT), is provided as base powder in consideration of high temperature characteristics, temperature coefficient of capacitance (TCC) at high temperatures may be improved. However, changes in dielectric constant according to an AC electric field may be significant, and side effects such as a decrease in room temperature RC values and an increase in dissipation factor (DF) may occur.

However, according to the exemplary embodiment, the dielectric ceramic composition may have excellent high temperature characteristics (X8R characteristics) and excellent reliability and reduce the occurrence of the side effects by mixing a first major component with a second major component at an appropriate ratio and adjusting composition of additives (the minor component), wherein a Ca content differs in the first major component and the second major component.

In addition, when $CaZrO_3$ and an excessive amount of rare-earth element are added to $BaTiO_3$ in order to satisfy high temperature characteristics (X8R characteristics), the high temperature characteristics may be satisfactory; however, since a Curie temperature of the major component itself is 125° C., there may be limitations in improving temperature coefficient of capacitance (TCC) characteristics at high temperatures.

Further, the pyrochlore phase is formed by adding the excessive amount of rare-earth element, resulting in deterioration of reliability.

However, according to exemplary embodiments, by adjusting the content of the first major component and the second major component, the high temperature characteristics (X8R characteristics) and the TCC characteristics at high temperatures may be satisfactory.

Further, the ratio of the peak of the pyrochlore phase to the peak of $BaTiO_3$ may be adjusted and reliability may be guaranteed by adjusting the content of the rare-earth element.

Therefore, a multilayer ceramic capacitor to which the dielectric ceramic composition according to the exemplary embodiment is applied, may satisfy high temperature characteristics (X8R characteristics) and have excellent TCC characteristics at high temperatures.

In addition, by adjusting a (Ba+Ca)/Si ratio of the minor components in order to obtain appropriate permittivity and sinterability, the permittivity and sinterability may be appropriately obtained and the high temperature characteristics (X8R characteristics) may be satisfactory.

The dielectric ceramic composition according to the exemplary embodiment may include the major component and the minor component, and the minor component may include first to sixth minor components.

Hereinafter, each component of the dielectric ceramic composition according to exemplary embodiments will be described in detail.

a) Major Component (Base Material)

The dielectric ceramic composition according to exemplary embodiments may include a major component (a base material) including Ba and Ti.

According to exemplary embodiments o, the major component may include a first major component represented by $(Ba_{1-x}Ca_x)TiO_3$ (x≤0.02) and a second major component represented by $(Ba_{1-y}Ca_y)TiO_3$ (0.04≤y≤0.12).

Here, x may be 0 or more, and when x is 0, the first major component may be $BaTiO_3$.

The major component may be in the form of powder, and the first major component and the second major component may be included in the dielectric ceramic composition as a first base powder and a second base powder, respectively.

According to exemplary embodiments, when a molar ratio of the first major component is 1-z and a molar ratio of the second major component is z, z may satisfy 0.3≤z≤0.8.

For example, when mixed powder in which the first base powder is mixed with the second base powder is represented by $(1-z)(Ba_{1-x}Ca_x)TiO_3+z(Ba_{1-y}Ca_y)TiO_3$, z may satisfy 0.3≤z≤0.8.

According to exemplary embodiments, when z satisfies 0.3≤z≤0.8, the dielectric ceramic composition may form a sintered body having a fine structure after sintering, and in this case, excellent TCC, low DF, and high RC values may be simultaneously realized.

An average grain size of the base powder may be 1000 nm or less, but is not limited thereto.

When $CaZrO_3$ and an excessive amount of rare-earth element are added to the $BaTiO_3$ base material, the X8R temperature characteristics may be satisfactory; however, since a Curie temperature of the base material itself is approximately 125° C., there may be limitations in improving TCC characteristics at high temperatures. In addition, the pyrochlore phase may be formed by adding the excessive amount of rare-earth element, resulting in deterioration of reliability.

However, according to exemplary embodiments, when the mixed powder (the major component) including the first base powder and the second base powder is mixed with additives (a minor component) to form a fine structure in which first and second crystal grains are mixed, TCC characteristics at high temperatures may be satisfactory as compared to a case in which $CaZrO_3$ or the excessive amount of rare-earth element is added to the $BaTiO_3$ base material.

In addition, according to exemplary embodiments, when the mixed powder (the major component) including the first base powder and the second base powder is mixed with the additives (the minor component) to form the fine structure in which the first and second crystal grains are mixed, low DF and high insulation resistance properties may be realized as compared to a case in which barium calcium titanate (BCT) is used alone as a base material.

b) First Minor Component

According to exemplary embodiments, the dielectric ceramic composition may include at least one selected from the group consisting of oxides and carbonates of at least one of Mn, V, Cr, Fe, Ni, Co, Cu, and Zn, as a first minor component.

The first minor component may have a content of 0.1 to 2.0 parts by mol on the basis of 100 parts by mol of the major component (the base material).

The content of the first minor component may be determined on the basis of a content of at least one of Mn, V, Cr, Fe, Ni, Co, Cu and Zn included in the first minor component, regardless of the oxide or carbonate form of the corresponding element.

For example, at least one of variable-valence acceptor elements of Mn, V, Cr, Fe, Ni, Co, Cu, and Zn included in the first minor component may have a total content of 0.1 to 2.0 parts by mol on the basis of 100 parts by mol of the major component.

The first minor component may enhance non-reducibility of the dielectric ceramic composition and to improve high temperature withstand voltage characteristics of a multilayer ceramic capacitor to which the dielectric ceramic composition is applied.

The content of the first minor component and each content of second to fourth minor components and a sixth minor component to be described below may be a relative amount on the basis of 100 parts by mol of the major component, in particular, may be defined as parts by mol of a metal or a semi-metal (Si) included in each minor component. The parts by mol of the metal or the semi-metal may include parts by mol of the metal or the semi-metal in an ionic state.

When the content of the first minor component is 0.1 to 2.0 parts by mol on the basis of 100 parts by mol of the major component, the dielectric ceramic composition may have an appropriate RC value and satisfactory high temperature withstand voltage characteristics.

When the content of the first minor component is less than 0.1 parts by mol, the RC value may be significantly low or the high temperature withstand voltage may be decreased.

When the content of the first minor component exceeds 2.0 parts by mol, the RC value may be decreased.

The dielectric ceramic composition according to exemplary embodiments may include the first minor component having a content of 0.1 to 2.0 parts by mol on the basis of 100 parts by mol of the base material, and therefore, it may be sintered at low temperatures and have excellent high temperature withstand voltage characteristics.

c) Second Minor Component

According to exemplary embodiments, the dielectric ceramic composition may include at least one selected from the group consisting of oxides and carbonates of a fixed-valence acceptor element including Mg, as a second minor component.

The second minor component may have a content of 2.0 parts by mol or less on the basis of 100 parts by mol of the major component (the base material).

The content of the second minor component may be determined on the basis of a content of Mg included in the second minor component, regardless of the oxide or carbonate form of the corresponding element, Mg.

For example, the content of Mg included in the second minor component may be 2.0 parts by mol or less on the basis of 100 parts by mol of the major component.

When the content of the second minor component exceeds 2.0 parts by mol on the basis of 100 parts by mol of the major component of the dielectric ceramic composition, a dielectric constant may be decreased and the high temperature withstand voltage characteristics may be decreased.

d) Third Minor Component

According to exemplary embodiments, the dielectric ceramic composition may include at least one selected from the group consisting of oxides and carbonates of at least one of Y, Dy, Ho, Sm, Gd, Er, La, Ce, Nd, Pr, and Tb, as a third minor component.

The third minor component may have a content of 0.2 to 5.0 parts by mol on the basis of 100 parts by mol of the major component.

The content of the third minor component may be determined on the basis of a content of at least one of Y, Dy, Ho, Sm, Gd, Er, La, Ce, Nd, Pr, and Tb included in the third minor component, regardless of the oxide or carbonate form of the corresponding element.

For example, at least one of Y, Dy, Ho, Sm, Gd, Er, La, Ce, Nd, Pr, and Tb included in the third minor component may have a total content of 0.2 to 5.0 parts by mol on the basis of 100 parts by mol of the major component.

The third minor component may serve to prevent deterioration in reliability of a multilayer ceramic capacitor to which the dielectric ceramic composition is applied.

In detail, in an XRD analysis of a sintered body obtained by sintering the dielectric ceramic composition in which the content of the third minor component is adjusted, when a (110) plane peak of a $BaTiO_3$ crystal phase is set as 1.00, a ratio of a peak of a pyrochlore phase ($RE_2Ti_2O_7$) at about 30.5 degrees with respect to the peak of the $BaTiO_3$ crystal phase may satisfy 0.02 or less, where RE is at least one of Y, Dy, Ho, Sm, Gd, Er, La, Ce, Nd, Pr, and Tb.

When the content of the third minor component is less than 0.2 parts by mol on the basis of 100 parts by mol of the major component, the improvement of TCC at high temperatures may be insignificant, and when the content of the third minor component exceeds 5.0 parts by mol on the basis of 100 parts by mol of the major component, the high temperature withstand voltage characteristics may deteriorate due to the formation of the pyrochlore phase ($RE_2Ti_2O_7$) (wherein RE is at least one of Y, Dy, Ho, Sm, Gd, Er, La, Ce, Nd, Pr, and Tb).

e) Fourth Minor Component

According to exemplary embodiments, the dielectric ceramic composition may include at least one selected from the group consisting of oxides and carbonates of at least one of Ba and Ca, as a fourth minor component.

The fourth minor component may have a content of 0.72 to 7.68 parts by mol on the basis of 100 parts by mol of the major component.

The content of the fourth minor component may be determined on the basis of a content of at least one of Ba and Ca included in the fourth minor component, regardless of the oxide or carbonate form of the corresponding element.

For example, at least one of Ba and Ca included in the fourth minor component may have a total content of 0.72 to 7.68 parts by mol on the basis of 100 parts by mol of the major component.

When the content of the fourth minor component is 0.72 to 7.68 parts by mol on the basis of 100 parts by mol of the major component, the high temperature withstand voltage characteristics may be improved.

f) Fifth Minor Component

According to exemplary embodiments, the dielectric ceramic composition may include $CaZrO_3$ as a fifth minor component.

The content of $CaZrO_3$ may be 3 parts by mol or less on the basis of 100 parts by mol of the major component.

When the content of the fifth minor component ($CaZrO_3$) exceeds 3 parts by mol on the basis of 100 parts by mol of the major component, the composition may deviate from TCC characteristics at a low temperature of $-55°$ C.

g) Sixth Minor Component

According to exemplary embodiments, the dielectric ceramic composition may include at least one selected from the group consisting of oxides and carbonates of Si, and glass including Si, as a sixth minor component.

The sixth minor component may have a content of 0.5 to 3.0 parts by mol on the basis of 100 parts by mol of the major component.

The content of the sixth minor component may be determined on the basis of the content of Si included in the sixth minor component, regardless of the glass, oxide, or carbonate form of the corresponding element, Si.

When the content of the sixth minor component is less than 0.5 parts by mol on the basis of 100 parts by mol of the major component, permittivity and high temperature withstand voltage characteristics may deteriorate, and when the content of the sixth minor component exceeds 3.0 parts by mol on the basis of 100 parts by mol of the major component, problems such as deterioration in sinterability and density, the formation of a secondary phase, may occur.

Figure 3:
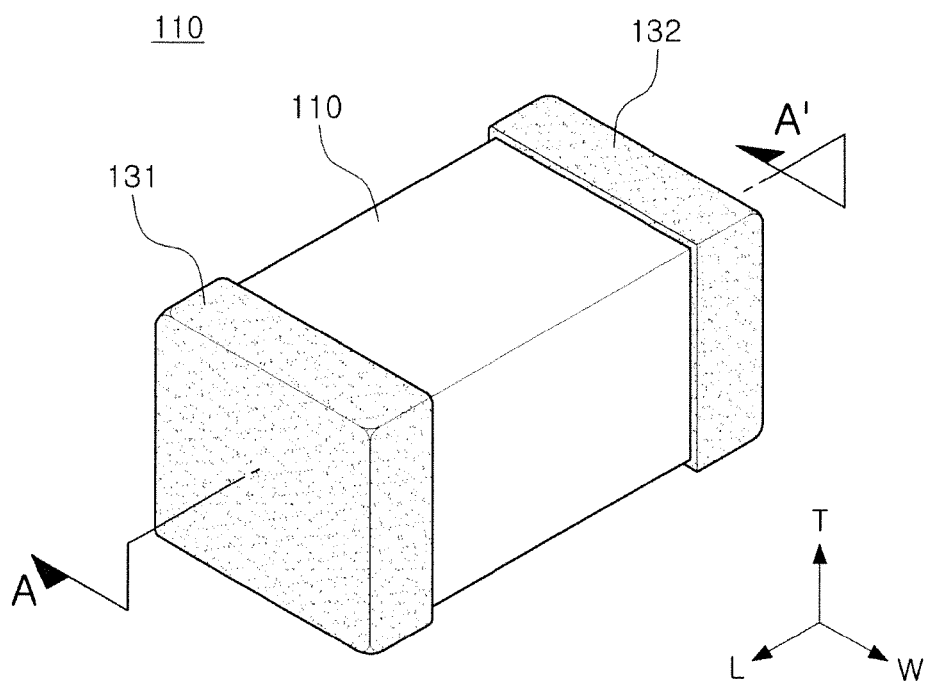
FIG. 3 is a schematic perspective view of a multilayer ceramic capacitor according to another exemplary embodiment in the present disclosure.
Figure 4:
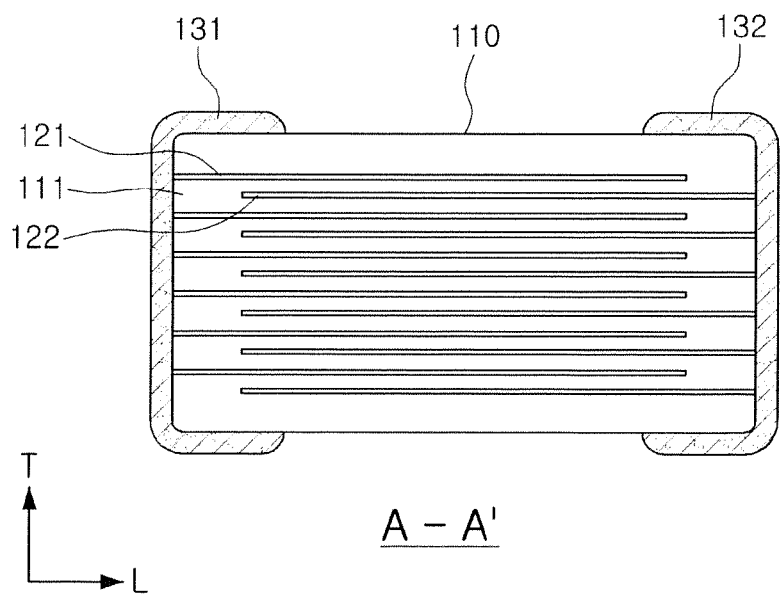
FIG. 4 is a schematic cross-sectional view of the multilayer ceramic capacitor taken along line A-A' of FIG. 3.

FIG. 3 is a schematic perspective view of a multilayer ceramic capacitor according to another exemplary embodiment in the present disclosure; and FIG. 4 is a schematic cross-sectional view of the multilayer ceramic capacitor taken along line A-A' of FIG. 3.

Referring to FIGS. 3 and 4, a multilayer ceramic capacitor 100 according to another exemplary embodiment may have a ceramic body 110 in which dielectric layers 111 and internal electrodes 121 and 122 are alternately stacked. First and second external electrodes 131 and 132 may be formed on both end portions of the ceramic body 110 to be electrically connected to the first and second internal electrodes 121 and 122, respectively.

The ceramic body 110 may generally have a hexahedral shape, but is not limited thereto. In addition, the ceramic body 110 may have a size appropriate for the intended use thereof, for example, (0.6 mm to 5.6 mm)×(0.3 mm to 5.0 mm)×(0.3 mm to 1.9 mm), but the size of the ceramic body 110 is not limited thereto.

Further, a thickness of the dielectric layer 111 may be changed depending on target capacitance of the capacitor. According to exemplary embodiments, a single dielectric layer may have a thickness of 0.1 μm or more after being sintered.

In a case in which the dielectric layers are excessively thin, a small number of crystal grains are present in a single dielectric layer, which brings a negative effect on reliability. Therefore, each of the dielectric layers may have a thickness of 0.1 μm or more.

The first and second internal electrodes 121 and 122 may be stacked while allowing end portions thereof to be exposed to both end surfaces of the ceramic body 110.

The first and second external electrodes 131 and 132 may be formed on both end portions of the ceramic body 110 and be electrically connected to the exposed end portions of the first and second internal electrodes 121 and 122, thereby configuring a circuit of the capacitor.

A conductive material contained in the first and second internal electrodes 121 and 122 may be nickel (Ni), but is not limited thereto.

A thickness of each of the first and second internal electrodes 121 and 122 may be appropriately determined depending on the use thereof, or the like, for example, 0.1 μm to 5 μm or 0.1 μm to 2.5 μm, but is not limited thereto.

A conductive material contained in the first and second external electrodes 131 and 132 may be nickel (Ni), copper (Cu), or alloys thereof, but is not limited thereto.

The dielectric layers 111 forming the ceramic body 110 may include a dielectric ceramic composition according to exemplary embodiments.

The dielectric layers 111 forming the ceramic body 110 may be formed by sintering a dielectric ceramic composition according to exemplary embodiments.

The dielectric ceramic composition may include: a major component (a barium titanate-based base material) and a minor component, wherein the dielectric ceramic composition is sintered to form a sintered body having a fine structure, the fine structure includes first crystal grains in which a Ca content is lower than 2.5 mol % and second crystal grains in which a Ca content is between 2.5 mol % to 13.5 mol %, and the second crystal grains have a cross-sectional area ratio of 30% to 80% on the basis of 100% of the overall cross-sectional area of the fine structure.

In an XRD analysis of the sintered body, when a (110) peak of $BaTiO_3$ is set as 1.00, a ratio of a peak of pyrochlore ($RE_2Ti_2O_7$) at about 30.5 degrees with respect to the (110) peak of $BaTiO_3$ may satisfy 0.02 or less, where RE is at least one of Y, Dy, Ho, Sm, Gd, Er, La, Ce, Nd, Pr, and Tb.

According to exemplary embodiments, the dielectric layer may be formed by sintering the dielectric ceramic composition, and the fine structure of the dielectric layer may include first crystal grains in which a Ca content is lower than 2.5 mol % and second crystal grains in which a Ca content is between 2.5 mol % to 13.5 mol %, and the second crystal grains may have a cross-sectional area ratio of 30% to 80% on the basis of 100% of the overall cross-sectional area of the fine structure.

In an XRD analysis of the dielectric layer according to exemplary embodiments, when a (110) peak of $BaTiO_3$ is set as 1.00, a ratio of a peak of a pyrochlore phase ($RE_2Ti_2O_7$) at about 30.5 degrees with respect to the peak of $BaTiO_3$ may satisfy 0.02 or less, where RE is at least one of Y, Dy, Ho, Sm, Gd, Er, La, Ce, Nd, Pr, and Tb.

Since the dielectric ceramic composition for the dielectric layer is the same as the dielectric ceramic composition according to the previous exemplary embodiments, details thereof will be omitted.

Hereinafter, although the present inventive concept will be detailed with reference to Inventive and Comparative Examples, these examples are to help a specific understanding of the present inventive concept, and the scope of the present inventive concept is not limited thereto.

Experimental Examples $(1-z)(Ba_{1-x}Ca_x)TiO_3 + z(Ba_{1-y}Ca_y)TiO_3$ mixed solid-solution powder which is a major component (base powder) including a first major component and a second major component was prepared using a solid phase method as follows.

Starting raw materials were $BaCO_3$, $TiO_2$, and $CaCO_3$. These starting raw materials were mixed by a ball mill, and calcined at 900° C. to 1000° C. to prepare $(Ba_{1-x}Ca_x)TiO_3$ first base powder and $(Ba_{1-y}Ca_y)TiO_3$ second base powder (x<y), each of which having an average particle size of 300 nm. After a minor component (additive powder) was added to the major component (the base powder) according to composition ratios provided in Tables 1, 3, 5 and 7, the raw material powder including the major component and the minor component was mixed with ethanol/toluene, a dispersant, and a binder by using a zirconia ball as a mixing/dispersion media, followed by ball milling for 20 hours.

The prepared slurry was formed as molded sheets each having a thickness of 10 µm by using a doctor blade coater. Ni internal electrodes were printed onto the molded sheets. Upper and lower covers were formed by stacking 25 cover sheets on 21 active sheets on which the internal electrodes were printed, and then pressurized to form a compressed bar. The compressed bar was cut by a cutting device to thereby obtain chips, each of which was 3216-sized (length×width×thickness: 3.2 mm×1.6 mm×1.6 mm).

After each chip was plasticized and sintered under a reducing atmosphere (0.1% of $H_2$/99.9% of $N_2$, $H_2O/H_2/N_2$ atmosphere) at 1200° C. to 1250° C. for 2 hours, the sintered chip was heat-treated by performing reoxidation under a nitrogen ($N_2$) atmosphere at 1000° C. for 3 hours. The chip including dielectric layers having a fine structure and the internal electrodes was obtained.

A copper (Cu) paste was applied to the sintered chip and sintered to form external electrodes.

A proto-type sample, MLCC which was manufactured using the above-described method was evaluated in view of capacitance, DF, insulation resistance, TCC, and resistance degradation behavior depending on an increase in voltage levels at a high temperature of 150° C.

Room temperature capacitance and DF of the MLCC were measured under conditions of 1 kHz and AC 0.2 V/µm, using an LCR-meter.

A dielectric constant of the MLCC was calculated from the capacitance of the MLCC and the thickness of the dielectric layer, an area of the internal electrodes, and the number of stacked layers in the MLCC.

Room temperature insulation resistance (IR) of each sample was measured after DC 10 V/µm was applied thereto for 60 seconds.

TCC was measured depending on temperature changes in a temperature range of −55° C. to 150° C.

In a high temperature IR voltage-boost test, resistance degradation behavior was measured by increasing a voltage level of 5 V/µm per each step at 150° C., wherein each step lasted 10 minutes and resistance values were measured at 5-second intervals.

High temperature withstand voltage was obtained from the high temperature IR voltage-boost test, wherein the withstand voltage refers to a maximum voltage allowing IR to be maintained at $10^5 \Omega$ or more when a DC voltage level of 5 V/µm was applied to the 3216-sized chip including 20 dielectric layers having a thickness of 7 µm after being sintered, at 150° C. for 10 minutes, and was then continuously increased by 5 V/µm per each step.

X-ray diffraction (XRD) analysis was carried out to verify whether a pyrochlore phase ($Y_2Ti_2O_7$) is present in the dielectric layer by determining whether a peak of the corresponding phase is present at about 30.5 degrees of an angle of diffraction (2θ).

In the dielectric layer, crystal grains in which a Ca content is lower than 2.5 mol % refer to first crystal grains, and crystal grains in which a Ca content is between 2.5 mol % to 13.5 mol % refer to second crystal grains.

A cross-sectional area ratio (%) of the first crystal grain (100-a) and a cross-sectional area ratio (%) of the second crystal grain (a) were calculated by analyzing the Ca content in 20 crystal grains through STEM/EDS analysis. The Ca content in a single crystal grain was determined as an average value of four Ca contents which were measured at P1 to P4 points of the corresponding crystal grain (see FIG. 1).

The following Tables 1, 3, 5, and 7 show compositions of Experimental Examples, and Tables 2, 4, 6, and 8 show properties of proto-type MLCCs corresponding to the compositions indicated by Tables 1, 3, 5, and 7.

TABLE 1

| Sample | First Base Material (Major Component) $(Ba_{1-x}Ca_x)TiO_3$ | | Second Base Material (Major Component) | | Mixing Molar Ratio Between First Base Material (Major Component) and Second Base Material (Major Component) | |
|---|---|---|---|---|---|---|
| | Ba Content 1 − x | Ca Content x | Ba Content 1 − y | Ca Content y | First Base Material (Major component) 1 − z | Second Base Material (Major component) z |
| 1 | 1.000 | 0.000 | 0.970 | 0.030 | 1.000 | 0.000 |
| 2 | 1.000 | 0.000 | 0.970 | 0.030 | 0.000 | 1.000 |
| 3 | 1.000 | 0.000 | 0.960 | 0.040 | 0.800 | 0.200 |

TABLE 1-continued

| | | | | | | |
|---|---|---|---|---|---|---|
| 4 | 1.000 | 0.000 | 0.960 | 0.040 | 0.700 | 0.300 |
| 5 | 1.000 | 0.000 | 0.960 | 0.040 | 0.400 | 0.600 |
| 6 | 1.000 | 0.000 | 0.960 | 0.040 | 0.200 | 0.800 |
| 7 | 1.000 | 0.000 | 0.960 | 0.040 | 0.000 | 1.000 |
| 8 | 1.000 | 0.000 | 0.925 | 0.075 | 0.800 | 0.200 |
| 9 | 1.000 | 0.000 | 0.925 | 0.075 | 0.700 | 0.300 |
| 10 | 1.000 | 0.000 | 0.925 | 0.075 | 0.600 | 0.400 |
| 11 | 1.000 | 0.000 | 0.925 | 0.075 | 0.400 | 0.600 |
| 12 | 1.000 | 0.000 | 0.925 | 0.075 | 0.200 | 0.800 |
| 13 | 1.000 | 0.000 | 0.925 | 0.075 | 0.000 | 1.000 |
| 14 | 1.000 | 0.000 | 0.880 | 0.120 | 0.800 | 0.200 |
| 15 | 1.000 | 0.000 | 0.880 | 0.120 | 0.700 | 0.300 |
| 16 | 1.000 | 0.000 | 0.880 | 0.120 | 0.400 | 0.600 |
| 17 | 1.000 | 0.000 | 0.880 | 0.120 | 0.200 | 0.800 |
| 18 | 1.000 | 0.000 | 0.880 | 0.120 | 0.000 | 1.000 |
| 19 | 1.000 | 0.000 | 0.850 | 0.150 | 0.800 | 0.200 |
| 20 | 1.000 | 0.000 | 0.850 | 0.150 | 0.700 | 0.300 |
| 21 | 1.000 | 0.000 | 0.850 | 0.150 | 0.400 | 0.600 |
| 22 | 1.000 | 0.000 | 0.850 | 0.150 | 0.200 | 0.800 |
| 23 | 1.000 | 0.000 | 0.850 | 0.150 | 0.000 | 1.000 |

Number of Moles of Each Additive per 100 mol of Base Material (Major Component)

| Sample | First Minor Component $MnO_2$ | Second Minor Component $V_2O_5$ | Third Minor Component $MgCO_3$ | Fourth Minor Component $Y_2O_3$ | Fifth Minor Component $BaCO_3$ | | Sixth Minor Component $CaZrO_3$ | $SiO_2$ | Additive (Ba + Ca)/Si Ratio |
|---|---|---|---|---|---|---|---|---|---|
| | | | | | | $CaCO_3$ | | | |
| 1 | 0.20 | 0.10 | 0.00 | 0.75 | 2.20 | 0.00 | 1.00 | 1.25 | 1.76 |
| 2 | 0.20 | 0.10 | 0.00 | 0.75 | 2.20 | 0.00 | 1.00 | 1.25 | 1.76 |
| 3 | 0.20 | 0.10 | 0.00 | 0.75 | 2.20 | 0.00 | 1.00 | 1.25 | 1.76 |
| 4 | 0.20 | 0.10 | 0.00 | 0.75 | 2.20 | 0.00 | 1.00 | 1.25 | 1.76 |
| 5 | 0.20 | 0.10 | 0.00 | 0.75 | 2.20 | 0.00 | 1.00 | 1.25 | 1.76 |
| 6 | 0.20 | 0.10 | 0.00 | 0.75 | 2.20 | 0.00 | 1.00 | 1.25 | 1.76 |
| 7 | 0.20 | 0.10 | 0.00 | 0.75 | 2.20 | 0.00 | 1.00 | 1.25 | 1.76 |
| 8 | 0.20 | 0.10 | 0.00 | 0.75 | 2.20 | 0.00 | 1.00 | 1.25 | 1.76 |
| 9 | 0.20 | 0.10 | 0.00 | 0.75 | 2.20 | 0.00 | 1.00 | 1.25 | 1.76 |
| 10 | 0.20 | 0.10 | 0.00 | 0.75 | 2.20 | 0.00 | 1.00 | 1.25 | 1.76 |
| 11 | 0.20 | 0.10 | 0.00 | 0.75 | 2.20 | 0.00 | 1.00 | 1.25 | 1.76 |
| 12 | 0.20 | 0.10 | 0.00 | 0.75 | 2.20 | 0.00 | 1.00 | 1.25 | 1.76 |
| 13 | 0.20 | 0.10 | 0.00 | 0.75 | 2.20 | 0.00 | 1.00 | 1.25 | 1.76 |
| 14 | 0.20 | 0.10 | 0.00 | 0.75 | 2.20 | 0.00 | 1.00 | 1.25 | 1.76 |
| 15 | 0.20 | 0.10 | 0.00 | 0.75 | 2.20 | 0.00 | 1.00 | 1.25 | 1.76 |
| 16 | 0.20 | 0.10 | 0.00 | 0.75 | 2.20 | 0.00 | 1.00 | 1.25 | 1.76 |
| 17 | 0.20 | 0.10 | 0.00 | 0.75 | 2.20 | 0.00 | 1.00 | 1.25 | 1.76 |
| 18 | 0.20 | 0.10 | 0.00 | 0.75 | 2.20 | 0.00 | 1.00 | 1.25 | 1.76 |
| 19 | 0.20 | 0.10 | 0.00 | 0.75 | 2.20 | 0.00 | 1.00 | 1.25 | 1.76 |
| 20 | 0.20 | 0.10 | 0.00 | 0.75 | 2.20 | 0.00 | 1.00 | 1.25 | 1.76 |
| 21 | 0.20 | 0.10 | 0.00 | 0.75 | 2.20 | 0.00 | 1.00 | 1.25 | 1.76 |
| 22 | 0.20 | 0.10 | 0.00 | 0.75 | 2.20 | 0.00 | 1.00 | 1.25 | 1.76 |
| 23 | 0.20 | 0.10 | 0.00 | 0.75 | 2.20 | 0.00 | 1.00 | 1.25 | 1.76 |

TABLE 2

Ni-MLCC Proto-type SPL Properties
(Dielectric Constant/DF Measurement Condition: AC 0.2 V/um, 1 kHz, Room Temperature Specific Resistance: DC 10 V/um)
First Crystal Grain: Ca Content lower than 2.5 mol %, Second Crystal Grain: Ca Content between 2.5 to 13.5 mol %
(By STEM/EDS Analysis)

| Sample | Cross-sectional Area Ratio (%) of First Crystal Grain: 100 − a | Cross-sectional Area Ratio (%) of Second Crystal Grain: a | Room Temperature Dielectric Constant | DF(%) | RC(ΩF) | TCC(%) (−55° C.) | TCC(%) (125° C.) | TCC(%) (150° C.) | High Temperature (150° C.) Withstand Voltage (V/um)* | Ratio of Peak of Pyrochlore ($RE_2Ti_2O_7$) to Peak of $BaTiO_3$ | Properties Evaluation |
|---|---|---|---|---|---|---|---|---|---|---|---|
| 1 | 100.0% | 0.0% | 2350 | 3.25 | 1652 | −12.50% | −5.50% | −20.50% | 60 | <0.01 | X |
| 2 | 0.0% | 100.0% | 2374 | 7.66 | 856 | −13.60% | 0.50% | −14.90% | 60 | <0.01 | X |
| 3 | 77.0% | 23.0% | 2361 | 4.34 | 1455 | −12.40% | −2.60% | −18.40% | 60 | <0.01 | X |
| 4 | 70.0% | 30.0% | 2335 | 5.23 | 1369 | −13.10% | 1.40% | −14.80% | 60 | <0.01 | ○ |
| 5 | 42.0% | 58.0% | 2323 | 6.04 | 1134 | −13.50% | 2.20% | −13.50% | 60 | <0.01 | ○ |
| 6 | 21.0% | 79.0% | 2345 | 7.20 | 1023 | −13.80% | 2.70% | −12.70% | 65 | <0.01 | ○ |
| 7 | 3.0% | 97.0% | 2322 | 8.11 | 784 | −14.40% | 3.30% | −12.40% | 65 | <0.01 | X |

TABLE 2-continued

Ni-MLCC Proto-type SPL Properties
(Dielectric Constant/DF Measurement Condition: AC 0.2 V/um, 1 kHz, Room Temperature Specific Resistance: DC 10 V/um)
First Crystal Grain: Ca Content lower than 2.5 mol %, Second Crystal Grain: Ca Content between 2.5 to 13.5 mol %
(By STEM/EDS Analysis)

| Sample | Cross-sectional Area Ratio (%) of First Crystal Grain: 100 − a | Cross-sectional Area Ratio (%) of Second Crystal Grain: a | Room Temperature Dielectric Constant | DF(%) | RC(ΩF) | TCC(%) (−55° C.) | TCC(%) (125° C.) | TCC(%) (150° C.) | High Temperature (150° C.) Withstand Voltage (V/um)* | Ratio of Peak of Pyrochlore ($RE_2Ti_2O_7$) to Peak of $BaTiO_3$ | Properties Evaluation |
|---|---|---|---|---|---|---|---|---|---|---|---|
| 8  | 78.0% | 22.0% | 2328 | 4.98  | 1537 | −12.50% | −2.40% | −18.10% | 60 | <0.01 | X |
| 9  | 66.5% | 33.5% | 2320 | 5.12  | 1412 | −13.10% | 0.30%  | −14.70% | 60 | <0.01 | ○ |
| 10 | 62.0% | 38.0% | 2337 | 5.84  | 1268 | −13.30% | 0.60%  | −14.00% | 65 | <0.01 | ○ |
| 11 | 43.0% | 57.0% | 2341 | 6.45  | 1135 | −13.70% | 1.20%  | −13.10% | 65 | <0.01 | ○ |
| 12 | 22.0% | 78.0% | 2355 | 7.12  | 1012 | −14.10% | 2.50%  | −12.40% | 65 | <0.01 | ○ |
| 13 | 4.0%  | 96.0% | 2364 | 8.87  | 684  | −14.50% | 3.70%  | −11.10% | 60 | <0.01 | X |
| 14 | 76.4% | 23.6% | 2314 | 5.11  | 1554 | −11.80% | −2.60% | −17.90% | 60 | <0.01 | X |
| 15 | 68.2% | 31.8% | 2331 | 5.64  | 1345 | −12.20% | 1.40%  | −14.20% | 60 | <0.01 | ○ |
| 16 | 45.5% | 54.5% | 2346 | 6.25  | 1267 | −12.40% | 2.70%  | −13.10% | 65 | <0.01 | ○ |
| 17 | 20.5% | 79.5% | 2345 | 7.12  | 1024 | −13.50% | 3.50%  | −12.40% | 65 | <0.01 | ○ |
| 18 | 4.5%  | 95.5% | 2333 | 8.96  | 487  | −14.60% | 5.70%  | −10.60% | 65 | <0.01 | X |
| 19 | 77.0% | 0.0%  | 2214 | 3.48  | 1447 | −10.70% | −5.50% | −20.40% | 60 | <0.01 | X |
| 20 | 66.0% | 0.0%  | 2225 | 5.45  | 1205 | −11.10% | −4.70% | −19.50% | 65 | <0.01 | X |
| 21 | 45.0% | 0.0%  | 2341 | 8.84  | 742  | −12.40% | −3.70% | −15.40% | 65 | <0.01 | X |
| 22 | 22.0% | 0.0%  | 2282 | 9.12  | 664  | −13.50% | −2.20% | −14.80% | 60 | <0.01 | X |
| 23 | 2.5%  | 0.0%  | 2109 | 10.20 | 382  | −12.80% | −1.60% | −13.50% | 60 | <0.01 | X |

Samples 1 to 23 of Table 1 were obtained by fixing the Ca content (x) in the first base powder $(Ba_{1-x}Ca_x)TiO_3$ to 0 (Ca content: x=0), and changing the Ca content (y) in the second base powder $(Ba_{1-y}Ca_y)TiO_3$ and a ratio (z) of the second base powder to the mixed powder, under the following conditions: the first minor component included variable-valence acceptor elements, Mn and V having a total content of 0.4 mol, the second minor component included Mg having a content of 0 mol, the third minor component included a rare-earth element Y having a content of 1.5 mol, the fourth minor component included Ba and Ca having a total content of 2.2 mol, the fifth minor component included $CaZrO_3$ having a content of 1 mol, the sixth minor component included Si having a content of 1.25 mol, on the basis of 100 mol of the base material, that is, the mixed powder of $(1-z)(Ba_{1-x}Ca_x)TiO_3+z(Ba_{1-y}Ca_y)TiO_3$; and a (Ba+Ca)/Si ratio between the total content of the fourth minor component (Ba+Ca) and the content of the sixth minor component (Si) was fixed to 1.76, and respective properties of the corresponding samples of Table 1 are shown in Table 2.

In a case in which the Ca content (y) of the second base powder was 0.03, when the ratio (z) of the second base powder to the mixed powder was 0 (sample 1), TCC at a high temperature of 150° C. deviated from the X8R characteristics, and when z was 1 (sample 2), TCC at a high temperature of 150° C. satisfied the X8R characteristics. However, DF was increased to be 7.5% or more, and RC was decreased to be less than 1000 ΩF.

In samples 3 to 7 in which the Ca content (y) of the second base powder was 0.04 and the ratio (z) of the second base powder was changed, when z was 0.2 (sample 3), TCC at a high temperature of 150° C. deviated from the X8R characteristics, and when z was 1.0 (sample 7), DF was increased to be 7.5% or more, and RC was decreased to be less than 1000 ΩF. When z was 0.3 to 0.8 (samples 4 to 6), TCC at a high temperature of 150° C. satisfied the X8R characteristics, and low DF of 7.5% or less, RC of 1000 ΩF or more, and high temperature withstand voltage of 50 V/μm or more were obtained.

Here, it can be seen that the cross-sectional area ratio of the second crystal grains ranged from 30% to 80% on the basis of the overall cross-sectional area of the fine structure.

In samples 8 to 13 in which the Ca content (y) of the second base powder was 0.075 and the ratio (z) of the second base powder was changed, when z was 0.2 (sample 8), TCC at a high temperature of 150° C. deviated from the X8R characteristics, and when z was 1.0 (sample 13), DF was increased to be 7.5% or more and RC was decreased to be less than 1000 ΩF. When z was 0.3 to 0.8 (samples 9 to 12), TCC at a high temperature of 150° C. satisfied the X8R characteristics, and low DF of 7.5% or less, RC of 1000 ΩF or more, and high temperature withstand voltage of 50 V/μm or more were obtained.

Here, it can be seen that the cross-sectional area ratio of the second crystal grains ranged from 30% to 80% on the basis of the overall cross-sectional area of the fine structure.

In samples 14 to 18 in which the Ca content (y) of the second base powder was 0.12 and the ratio (z) of the second base powder was changed, when z was 0.2 (sample 14), TCC at a high temperature of 150° C. deviated from the X8R characteristics, and when z was 1.0 (sample 18), DF was increased to be 7.5% or more and RC was decreased to be less than 1000 ΩF. When z was 0.3 to 0.8 (samples 15 to 17), TCC at a high temperature of 150° C. satisfied the X8R characteristics, and low DF of 7.5% or less, RC of 1000 ΩF or more, and high temperature withstand voltage of 50 V/μm or more were obtained.

Here, it can be seen that the cross-sectional area ratio of the second crystal grains ranged from 30% to 80% on the basis of the overall cross-sectional area of the fine structure.

In samples 19 to 23 in which the Ca content (y) of the second base powder was 0.15 and the ratio (z) of the second base powder was changed, when z was 0.2, 0.3, and 0.6 (samples 19, 20, and 21), TCC at a high temperature of 150° C. deviated from the X8R characteristics, and when z was 0.8 and 1.0 (samples 22 and 23), DF was increased to be 7.5% or more, and RC was decreased to be less than 1000 ΩF. Therefore, when the Ca content (y) of the second base powder was 0.15, the corresponding samples failed to obtain the following features: TCC at a high temperature of 150° C. satisfying the X8R characteristics, low DF of 7.5% or less, RC of 1000 ΩF or more, and high temperature withstand voltage of 50 V/μm or more.

In this case, the second crystal grains did not exist.

From the results of samples 1 to 23, it can be seen that when the cross-sectional area ratio of the first crystal grains is 100-a and the cross-sectional area ratio of the second crystal grains is a, the fine structure according to the present inventive concept in which the cross-sectional area ratio (a) of the second crystal grains has a range of 30% to 80% is able to achieve desired properties. In the fine structure, when the Ca content (x) of the first base powder $(Ba_{1-x}Ca_x)TiO_3$ is 0, the Ca content (y) of the second base powder $(Ba_{1-y}Ca_y)TiO_3$ and the ratio (z) of the second base powder may satisfy $0.04 \leq y \leq 0.15$ and $0.3 \leq z \leq 0.8$.

TABLE 3

| | First Base Material (Major Component) $(Ba_{1-x}Ca_x)TiO_3$ | | Second Base Material (Major Component) | | Mixing Molar Ratio Between First Base Material (Major Component) and Second Base Material (Major Component) | |
|---|---|---|---|---|---|---|
| Sample | Ba Content 1 − x | Ca Content x | Ba Content 1 − y | Ca Content y | First Base Material (Major component) 1 − z | Second Base Material (Major component) z |
| 24 | 0.980 | 0.020 | 0.970 | 0.030 | 0.500 | 0.500 |
| 25 | 0.980 | 0.020 | 0.970 | 0.030 | 0.200 | 0.800 |
| 26 | 0.980 | 0.020 | 0.960 | 0.040 | 0.800 | 0.200 |
| 27 | 0.980 | 0.020 | 0.960 | 0.040 | 0.700 | 0.300 |
| 28 | 0.980 | 0.020 | 0.960 | 0.040 | 0.400 | 0.600 |
| 29 | 0.980 | 0.020 | 0.960 | 0.040 | 0.200 | 0.800 |
| 30 | 0.980 | 0.020 | 0.960 | 0.040 | 0.000 | 1.000 |
| 31 | 0.980 | 0.020 | 0.925 | 0.075 | 0.800 | 0.200 |
| 32 | 0.980 | 0.020 | 0.925 | 0.075 | 0.700 | 0.300 |
| 33 | 0.980 | 0.020 | 0.925 | 0.075 | 0.600 | 0.400 |
| 34 | 0.980 | 0.020 | 0.925 | 0.075 | 0.400 | 0.600 |
| 35 | 0.980 | 0.020 | 0.925 | 0.075 | 0.200 | 0.800 |
| 36 | 0.980 | 0.020 | 0.925 | 0.075 | 0.000 | 1.000 |
| 37 | 0.980 | 0.020 | 0.880 | 0.120 | 0.800 | 0.200 |
| 38 | 0.980 | 0.020 | 0.880 | 0.120 | 0.700 | 0.300 |
| 39 | 0.980 | 0.020 | 0.880 | 0.120 | 0.400 | 0.600 |
| 40 | 0.980 | 0.020 | 0.880 | 0.120 | 0.200 | 0.800 |
| 41 | 0.980 | 0.020 | 0.880 | 0.120 | 0.000 | 1.000 |

| | Number of Moles of Each Additive per 100 mol of Base Material (Major Component) | | | | | | | | |
|---|---|---|---|---|---|---|---|---|---|
| Sample | First Minor Component | Second Minor Component | Third Minor Component | Fourth Minor Component | | Fifth Minor Component | Sixth Minor Component | | Additive (Ba + Ca)/ Si Ratio |
| | $MnO_2$ | $V_2O_5$ | $MgCO_3$ | $Y_2O_3$ | $BaCO_3$ | $CaCO_3$ | $CaZrO_3$ | $SiO_2$ | |
| 24 | 0.20 | 0.10 | 0.00 | 0.75 | 2.20 | 0.00 | 1.00 | 1.25 | 1.76 |
| 25 | 0.20 | 0.10 | 0.00 | 0.75 | 2.20 | 0.00 | 1.00 | 1.25 | 1.76 |
| 26 | 0.20 | 0.10 | 0.00 | 0.75 | 2.20 | 0.00 | 1.00 | 1.25 | 1.76 |
| 27 | 0.20 | 0.10 | 0.00 | 0.75 | 2.20 | 0.00 | 1.00 | 1.25 | 1.76 |
| 28 | 0.20 | 0.10 | 0.00 | 0.75 | 2.20 | 0.00 | 1.00 | 1.25 | 1.76 |
| 29 | 0.20 | 0.10 | 0.00 | 0.75 | 2.20 | 0.00 | 1.00 | 1.25 | 1.76 |
| 30 | 0.20 | 0.10 | 0.00 | 0.75 | 2.20 | 0.00 | 1.00 | 1.25 | 1.76 |
| 31 | 0.20 | 0.10 | 0.00 | 0.75 | 2.20 | 0.00 | 1.00 | 1.25 | 1.76 |
| 32 | 0.20 | 0.10 | 0.00 | 0.75 | 2.20 | 0.00 | 1.00 | 1.25 | 1.76 |
| 33 | 0.20 | 0.10 | 0.00 | 0.75 | 2.20 | 0.00 | 1.00 | 1.25 | 1.76 |
| 34 | 0.20 | 0.10 | 0.00 | 0.75 | 2.20 | 0.00 | 1.00 | 1.25 | 1.76 |
| 35 | 0.20 | 0.10 | 0.00 | 0.75 | 2.20 | 0.00 | 1.00 | 1.25 | 1.76 |
| 36 | 0.20 | 0.10 | 0.00 | 0.75 | 2.20 | 0.00 | 1.00 | 1.25 | 1.76 |
| 37 | 0.20 | 0.10 | 0.00 | 0.75 | 2.20 | 0.00 | 1.00 | 1.25 | 1.76 |
| 38 | 0.20 | 0.10 | 0.00 | 0.75 | 2.20 | 0.00 | 1.00 | 1.25 | 1.76 |
| 39 | 0.20 | 0.10 | 0.00 | 0.75 | 2.20 | 0.00 | 1.00 | 1.25 | 1.76 |
| 40 | 0.20 | 0.10 | 0.00 | 0.75 | 2.20 | 0.00 | 1.00 | 1.25 | 1.76 |
| 41 | 0.20 | 0.10 | 0.00 | 0.75 | 2.20 | 0.00 | 1.00 | 1.25 | 1.76 |

TABLE 4

Ni-MLCC Proto-type SPL Properties
(Dielectric Constant/DF Measurement Condition: AC 0.2 V/μm, 1 kHz, Room Temperature Specific Resistance: DC 10 V/μm)
First Crystal Grain: Ca Content lower than 2.5 mol %, Second Crystal Grain: Ca Content between 2.5 to 13.5 mol %
(By STEM/EDS Analysis)

| Sample | Cross-sectional Area Ratio (%) of First Crystal Grain: 100 − a | Cross-sectional Area Ratio (%) of Second Crystal Grain: a | Room Temperature Dielectric Constant | DF(%) | RC(ΩF) | TCC(%) (−55° C.) | TCC(%) (125° C.) | TCC(%) (150° C.) | High Temperature (150° C.) Withstand Voltage (V/μm)* | Ratio of Peak of Pyrochlore ($RE_2Ti_2O_7$) to Peak of $BaTiO_3$ | Properties Evaluation |
|---|---|---|---|---|---|---|---|---|---|---|---|
| 24 | 49.0% | 51.0% | 2256 | 4.34 | 1452 | −12.20% | −4.60% | −19.70% | 60 | <0.01 | X |
| 25 | 21.0% | 79.0% | 2284 | 7.85 | 778 | −14.00% | 1.00% | −13.90% | 60 | <0.01 | X |
| 26 | 78.0% | 22.0% | 2342 | 4.45 | 1426 | −12.40% | −2.60% | −18.40% | 60 | <0.01 | X |
| 27 | 69.5% | 30.5% | 2258 | 4.32 | 1356 | −13.10% | 1.40% | −14.80% | 65 | <0.01 | ○ |
| 28 | 43.0% | 57.0% | 2351 | 6.40 | 1128 | −13.50% | 2.20% | −13.50% | 65 | <0.01 | ○ |
| 29 | 20.5% | 79.5% | 2317 | 7.36 | 1002 | −13.80% | 2.70% | −12.70% | 65 | <0.01 | ○ |
| 30 | 2.5% | 97.5% | 2285 | 8.26 | 776 | −14.40% | 3.30% | −12.40% | 60 | <0.01 | X |
| 31 | 76.5% | 23.5% | 2264 | 4.99 | 1463 | −12.50% | −2.40% | −18.10% | 60 | <0.01 | X |
| 32 | 68.5% | 31.5% | 2249 | 5.23 | 1329 | −13.10% | 0.30% | −14.70% | 65 | <0.01 | ○ |
| 33 | 61.0% | 39.0% | 2267 | 5.96 | 1154 | −13.30% | 0.60% | −14.00% | 65 | <0.01 | ○ |
| 34 | 44.0% | 56.0% | 2212 | 6.55 | 1089 | −13.70% | 1.20% | −13.10% | 65 | <0.01 | ○ |
| 35 | 23.5% | 76.5% | 2208 | 7.23 | 1001 | −14.10% | 2.50% | −12.40% | 65 | <0.01 | ○ |
| 36 | 3.5% | 96.5% | 2236 | 8.99 | 645 | −14.50% | 3.70% | −11.10% | 60 | <0.01 | X |
| 37 | 76.4% | 23.6% | 2184 | 5.22 | 1520 | −11.80% | −2.60% | −17.90% | 60 | <0.01 | X |
| 38 | 66.5% | 33.5% | 2167 | 5.74 | 1297 | −12.20% | 1.40% | −14.20% | 65 | <0.01 | ○ |
| 39 | 47.5% | 52.5% | 2145 | 6.32 | 2286 | −12.40% | 2.70% | −13.10% | 60 | <0.01 | ○ |
| 40 | 20.5% | 79.5% | 2163 | 7.23 | 1011 | −13.50% | 3.50% | −12.40% | 60 | <0.01 | ○ |
| 41 | 2.0% | 98.0% | 2188 | 9.04 | 426 | −14.60% | 5.70% | −10.60% | 60 | <0.01 | X |

Samples 24 to 41 of Table 3 were obtained by fixing the Ca content (x) in the first base powder $(Ba_{1-x}Ca_x)TiO_3$ to 0.02 (Ca content: x=0.02), and changing the Ca content (y) in the second base powder $(Ba_{1-y}Ca_y)TiO_3$ and the ratio (z) of the second base powder to the mixed powder, under the following conditions: the first minor component included variable-valence acceptor elements, Mn and V having a total content of 0.4 mol, the second minor component included Mg having a content of 0 mol, the third minor component included a rare-earth element Y having a content of 1.5 mol, the fourth minor component included Ba and Ca having a total content of 2.2 mol, the fifth minor component included $CaZrO_3$ having a content of 1 mol, the sixth minor component included Si having a content of 1.25 mol, on the basis of 100 mol of the base material, that is, the mixed powder of $(1-z)(Ba_{1-x}Ca_x)TiO_3 + z(Ba_{1-y}Ca_z)TiO_3$; and a (Ba+Ca)/Si ratio between the total content of the fourth minor component (Ba+Ca) and the content of the sixth minor component (Si) was fixed to 1.76.

Respective properties of the corresponding samples of Table 3 are shown in Table 4.

In a case in which the Ca content (y) of the second base powder was 0.03, when the ratio (z) of the second base powder to the mixed powder was 0.5 (sample 24), TCC at a high temperature of 150° C. deviated from the X8R characteristics, and when z was 0.8 (sample 25), TCC at a high temperature of 150° C. satisfied the X8R characteristics. However, DF was increased to be 7.5% or more, and RC was decreased to be less than 1000 ΩF.

In samples 26 to 30 in which the Ca content (y) of the second base powder was 0.04 and the ratio (z) of the second base powder was changed, when z was 0.2 (sample 26), TCC at a high temperature of 150° C. deviated from the X8R characteristics, and when z was 1.0 (sample 30), DF was increased to be 7.5% or more, and RC was decreased to be less than 1000 ΩF. When z was 0.3 to 0.8 (samples 27 to 29), TCC at a high temperature of 150° C. satisfied the X8R characteristics, and low DF of 7.5% or less, RC of 1000 ΩF or more, and high temperature withstand voltage of 50 V/μm or more were obtained.

Here, it can be seen that the cross-sectional area ratio of the second crystal grains ranged from 30% to 80% on the basis of the overall cross-sectional area of the fine structure.

In samples 31 to 36 in which the Ca content (y) of the second base powder was 0.075 and the ratio (z) of the second base powder was changed, when z was 0.2 (sample 31), TCC at a high temperature of 150° C. deviated from the X8R characteristics, and when z was 1.0 (sample 36), DF was increased to be 7.5% or more, and RC was decreased to be less than 1000 ΩF. When z was 0.3 to 0.8 (samples 32 to 35), TCC at a high temperature of 150° C. satisfied the X8R characteristics, and low DF of 7.5% or less, RC of 1000 ΩF or more, and high temperature withstand voltage of 50 V/μm or more were obtained.

Here, it can be seen that the cross-sectional area ratio of the second crystal grains ranged from 30% to 80% on the basis of the overall cross-sectional area of the fine structure.

In samples 37 to 41 in which the Ca content (y) of the second base powder was 0.12 and the ratio (z) of the second base powder was changed, when z was 0.2 (sample 37), TCC at a high temperature of 150° C. deviated from the X8R characteristics, and when z was 1.0 (sample 41), DF was increased to be 7.5% or more and RC was decreased to be less than 1000 ΩF. When z was 0.3 to 0.8 (samples 38 to 40), TCC at a high temperature of 150° C. satisfied the X8R characteristics, and low DF of 7.5% or less, RC of 1000 ΩF or more, and high temperature withstand voltage of 50 V/μm or more were obtained.

Here, it can be seen that the cross-sectional area ratio of the second crystal grains ranged from 30% to 80% on the basis of the overall cross-sectional area of the fine structure.

From the results of samples 24 to 41, it can be seen that when the cross-sectional area ratio of the first crystal grains is 100-a and the cross-sectional area ratio of the second crystal grains is a, the fine structure according to the present inventive concept in which the cross-sectional area ratio (a) of the second crystal grains has a range of 30% to 80 is able to achieve desired properties.

In the fine structure, when the Ca content (x) of the first base powder $(Ba_{1-x}Ca_x)TiO_3$ is 0.02, the Ca content (y) of the second base powder $(Ba_{1-y}Ca_y)TiO_3$ and the ratio (z) of the second base powder may satisfy $0.04 \leq y \leq 0.12$ and $0.3 \leq z \leq 0.8$.

TABLE 5

| Sample | First Base Material (Major Component) $(Ba_{1-x}Ca_x)TiO_3$ | | Second Base Material (Major Component) | | Mixing Molar Ratio Between First Base Material (Major Component) and Second Base Material (Major Component) | |
|---|---|---|---|---|---|---|
| | Ba Content 1 − x | Ca Content x | Ba Content 1 − y | Ca Content y | First Base Material (Major component) 1 − z | Second Base Material (Major component) z |
| 42 | 1.000 | 0.000 | 0.925 | 0.075 | 0.600 | 0.400 |
| 43 | 1.000 | 0.000 | 0.925 | 0.075 | 0.600 | 0.400 |
| 44 | 1.000 | 0.000 | 0.925 | 0.075 | 0.600 | 0.400 |
| 45 | 1.000 | 0.000 | 0.925 | 0.075 | 0.600 | 0.400 |
| 46 | 1.000 | 0.000 | 0.925 | 0.075 | 0.600 | 0.400 |
| 47 | 1.000 | 0.000 | 0.925 | 0.075 | 0.600 | 0.400 |
| 48 | 1.000 | 0.000 | 0.925 | 0.075 | 0.600 | 0.400 |
| 49 | 1.000 | 0.000 | 0.925 | 0.075 | 0.600 | 0.400 |
| 50 | 1.000 | 0.000 | 0.925 | 0.075 | 0.600 | 0.400 |
| 51 | 1.000 | 0.000 | 0.925 | 0.075 | 0.600 | 0.400 |
| 52 | 1.000 | 0.000 | 0.925 | 0.075 | 0.600 | 0.400 |
| 53 | 1.000 | 0.000 | 0.925 | 0.075 | 0.600 | 0.400 |
| 54 | 1.000 | 0.000 | 0.925 | 0.075 | 0.600 | 0.400 |
| 55 | 1.000 | 0.000 | 0.925 | 0.075 | 0.600 | 0.400 |
| 56 | 1.000 | 0.000 | 0.925 | 0.075 | 0.600 | 0.400 |
| 57 | 1.000 | 0.000 | 0.925 | 0.075 | 0.600 | 0.400 |
| 58 | 1.000 | 0.000 | 0.925 | 0.075 | 0.600 | 0.400 |
| 59 | 1.000 | 0.000 | 0.925 | 0.075 | 0.600 | 0.400 |
| 60 | 1.000 | 0.000 | 0.925 | 0.075 | 0.600 | 0.400 |
| 61 | 1.000 | 0.000 | 0.925 | 0.075 | 0.600 | 0.400 |
| 62 | 1.000 | 0.000 | 0.925 | 0.075 | 0.600 | 0.400 |
| 63 | 1.000 | 0.000 | 0.925 | 0.075 | 0.600 | 0.400 |
| 64 | 1.000 | 0.000 | 0.925 | 0.075 | 0.600 | 0.400 |
| 65 | 1.000 | 0.000 | 0.925 | 0.075 | 0.600 | 0.400 |
| 66 | 1.000 | 0.000 | 0.925 | 0.075 | 0.600 | 0.400 |
| 67 | 1.000 | 0.000 | 0.925 | 0.075 | 0.600 | 0.400 |
| 68 | 1.000 | 0.000 | 0.925 | 0.075 | 0.600 | 0.400 |
| 69 | 1.000 | 0.000 | 0.925 | 0.075 | 0.600 | 0.400 |
| 70 | 1.000 | 0.000 | 0.925 | 0.075 | 0.600 | 0.400 |
| 71 | 1.000 | 0.000 | 0.925 | 0.075 | 0.600 | 0.400 |
| 72 | 1.000 | 0.000 | 0.925 | 0.075 | 0.600 | 0.400 |

| Sample | Number of Moles of Each Additive per 100 mol of Base Material (Major Component) | | | | | | Additive (Ba + Ca)/ Si Ratio |
|---|---|---|---|---|---|---|---|
| | First Minor Component $MnO_2$ | Second Minor Component $V_2O_5$ | Third Minor Component $MgCO_3$ | Fourth Minor Component $Y_2O_3$ | | Fifth Minor Component $CaZrO_3$ | Sixth Minor Component $SiO_2$ |
| | | | | | $BaCO_3$   $CaCO_3$ | | |
| 42 | 0.400 | 0.000 | 0.00 | 0.00 | 2.200   0.000 | 1.00 | 1.25 | 1.76 |
| 43 | 0.400 | 0.000 | 0.00 | 0.10 | 2.200   0.000 | 1.00 | 1.25 | 1.76 |
| 44 | 0.400 | 0.000 | 0.00 | 0.35 | 2.200   0.000 | 1.00 | 1.25 | 1.76 |
| 45 | 0.400 | 0.000 | 0.00 | 0.50 | 2.200   0.000 | 1.00 | 1.25 | 1.76 |
| 46 | 0.400 | 0.000 | 0.00 | 0.75 | 2.200   0.000 | 1.00 | 1.25 | 1.76 |
| 47 | 0.400 | 0.000 | 0.00 | 1.00 | 2.200   0.000 | 1.00 | 1.25 | 1.76 |
| 48 | 0.400 | 0.000 | 0.00 | 1.50 | 2.200   0.000 | 1.00 | 1.25 | 1.76 |
| 49 | 0.400 | 0.000 | 0.00 | 2.50 | 2.200   0.000 | 1.00 | 1.25 | 1.76 |
| 50 | 0.400 | 0.000 | 0.00 | 3.00 | 2.200   0.000 | 1.00 | 1.25 | 1.76 |
| 51 | 0.400 | 0.000 | 0.10 | 0.75 | 2.200   0.000 | 1.00 | 1.25 | 1.76 |
| 52 | 0.400 | 0.000 | 0.20 | 0.75 | 2.200   0.000 | 1.00 | 1.25 | 1.76 |
| 53 | 0.400 | 0.000 | 0.50 | 0.75 | 2.200   0.000 | 1.00 | 1.25 | 1.76 |
| 54 | 0.400 | 0.000 | 1.00 | 0.75 | 2.200   0.000 | 1.00 | 1.25 | 1.76 |
| 55 | 0.400 | 0.000 | 2.00 | 0.75 | 2.200   0.000 | 1.00 | 1.25 | 1.76 |
| 56 | 0.400 | 0.000 | 3.00 | 0.75 | 2.200   0.000 | 1.00 | 1.25 | 1.76 |
| 57 | 0.400 | 0.000 | 0.00 | 0.75 | 2.200   0.000 | 0.00 | 1.25 | 1.76 |
| 58 | 0.400 | 0.000 | 0.00 | 0.75 | 2.200   0.000 | 0.50 | 1.25 | 1.76 |
| 59 | 0.400 | 0.000 | 0.00 | 0.75 | 2.200   0.000 | 2.00 | 1.25 | 1.76 |
| 60 | 0.400 | 0.000 | 0.00 | 0.75 | 2.200   0.000 | 3.00 | 1.25 | 1.76 |
| 61 | 0.400 | 0.000 | 0.00 | 0.75 | 2.200   0.000 | 4.00 | 1.25 | 1.76 |
| 62 | 0.000 | 0.000 | 0.00 | 0.75 | 2.200   0.000 | 1.00 | 1.25 | 1.76 |
| 63 | 0.100 | 0.000 | 0.00 | 0.75 | 2.200   0.000 | 1.00 | 1.25 | 1.76 |
| 64 | 0.200 | 0.000 | 0.00 | 0.75 | 2.200   0.000 | 1.00 | 1.25 | 1.76 |

TABLE 5-continued

| | | | | | | | | | |
|---|---|---|---|---|---|---|---|---|---|
| 65 | 0.300 | 0.000 | 0.00 | 0.75 | 2.200 | 0.000 | 1.00 | 1.25 | 1.76 |
| 66 | 0.600 | 0.000 | 0.00 | 0.75 | 2.200 | 0.000 | 1.00 | 1.25 | 1.76 |
| 67 | 1.000 | 0.000 | 0.00 | 0.75 | 2.200 | 0.000 | 1.00 | 1.25 | 1.76 |
| 68 | 2.000 | 0.000 | 0.00 | 0.75 | 2.200 | 0.000 | 1.00 | 1.25 | 1.76 |
| 69 | 2.500 | 0.000 | 0.00 | 0.75 | 2.200 | 0.000 | 1.00 | 1.25 | 1.76 |
| 70 | 0.300 | 0.050 | 0.00 | 0.75 | 2.200 | 0.000 | 1.00 | 1.25 | 1.76 |
| 71 | 0.200 | 0.100 | 0.00 | 0.75 | 2.200 | 0.000 | 1.00 | 1.25 | 1.76 |
| 72 | 0.000 | 0.200 | 0.00 | 0.75 | 2.200 | 0.000 | 1.00 | 1.25 | 1.76 |

TABLE 6

Ni-MLCC Proto-type SPL Properties
(Dielectric Constant/DF Measurement Condition: AC 0.2 V/um, 1 kHz, Room Temperature Specific Resistance: DC 10 V/um)
First Crystal Grain: Ca Content lower than 2.5 mol %, Second Crystal Grain: Ca Content between 2.5 to 13.5 mol %
(By STEM/EDS Analysis)

| Sample | Cross-sectional Area Ratio (%) of First Crystal Grain: 100 − a | Cross-sectional Area Ratio (%) of Second Crystal Grain: a | Room Temperature Dielectric Constant | DF(%) | RC(ΩF) | TCC(%) (−55° C.) | TCC(%) (125° C.) | TCC(%) (150° C.) | High Temperature (150° C.) Withstand Voltage (V/um)* | Ratio of Peak of Pyrochlore ($RE_2Ti_2O_7$) to Peak of $BaTiO_3$ | Properties Evaluation |
|---|---|---|---|---|---|---|---|---|---|---|---|
| 42 | 60.5% | 39.5% | 2758 | 6.56 | 1055 | −10.5% | −6.8% | −14.2% | 40 | <0.01 | X |
| 43 | 59.4% | 40.6% | 2517 | 6.25 | 1142 | −8.8% | −2.5% | −14.2% | 50 | <0.01 | Δ |
| 44 | 59.8% | 40.2% | 2445 | 6.22 | 1223 | −7.7% | −2.2% | −13.8% | 55 | <0.01 | ○ |
| 45 | 61.2% | 38.8% | 2393 | 6.14 | 1345 | −8.4% | −2.7% | −13.2% | 55 | <0.01 | ○ |
| 46 | 60.8% | 39.2% | 2354 | 6.23 | 1427 | −8.9% | −2.6% | −13.0% | 60 | <0.01 | ○ |
| 47 | 60.1% | 39.9% | 2285 | 5.98 | 1526 | −9.4% | −1.8% | −12.5% | 65 | <0.01 | ○ |
| 48 | 61.5% | 38.5% | 2284 | 5.95 | 1632 | −9.2% | −1.4% | −13.6% | 60 | <0.01 | ○ |
| 49 | 59.8% | 40.2% | 2256 | 5.76 | 1774 | −7.7% | −1.2% | −14.5% | 55 | 0.02 | Δ |
| 50 | 59.4% | 40.6% | 2146 | 5.35 | 1702 | −7.5% | −0.9% | −13.3% | 35 | 0.05 | X |
| 51 | 61.0% | 39.0% | 2367 | 5.31 | 1217 | −7.9% | −0.8% | −13.0% | 60 | <0.01 | ○ |
| 52 | 61.6% | 38.4% | 2358 | 5.24 | 1355 | −7.4% | −1.2% | −13.4% | 60 | <0.01 | ○ |
| 53 | 60.4% | 39.6% | 2175 | 5.22 | 1454 | −7.2% | −1.4% | −13.6% | 60 | <0.01 | ○ |
| 54 | 59.8% | 40.2% | 2058 | 5.16 | 1658 | −6.8% | −1.7% | −14.2% | 60 | <0.01 | ○ |
| 55 | 58.5% | 41.5% | 1924 | 5.18 | 1897 | −6.4% | −2.0% | −15.0% | 60 | <0.01 | Δ |
| 56 | 62.0% | 38.0% | 1774 | 5.11 | 2034 | −5.9% | −0.5% | −14.5% | 40 | <0.01 | X |
| 57 | 58.7% | 41.3% | 2254 | 5.48 | 1002 | −5.6% | 2.4% | −13.8% | 45 | <0.01 | X |
| 58 | 58.6% | 41.4% | 2278 | 5.61 | 1023 | −7.2% | 1.1% | −12.5% | 60 | <0.01 | ○ |
| 59 | 61.5% | 38.5% | 2294 | 5.74 | 1345 | −12.3% | 0.8% | −12.5% | 60 | <0.01 | ○ |
| 60 | 57.2% | 42.8% | 2546 | 5.99 | 1458 | −14.5% | −1.2% | −12.2% | 60 | <0.01 | ○ |
| 61 | 56.8% | 43.2% | 2658 | 6.25 | 1523 | −16.4% | −2.3% | −13.4% | 60 | <0.01 | X |
| 62 | 62.0% | 38.0% | | | 0.2 | — | — | — | 5 | <0.01 | X |
| 63 | 62.0% | 38.0% | 2343 | 7.52 | 1055 | −1.2% | 1.2% | −13.8% | 50 | <0.01 | Δ |
| 64 | 62.0% | 38.0% | 2311 | 7.12 | 1673 | −0.5% | 1.1% | −14.4% | 55 | <0.01 | ○ |
| 65 | 62.0% | 38.0% | 2367 | 6.55 | 1248 | −0.8% | −0.5% | −13.5% | 55 | <0.01 | ○ |
| 66 | 62.0% | 38.0% | 2276 | 5.99 | 1184 | −0.4% | −1.1% | −12.9% | 60 | <0.01 | ○ |
| 67 | 62.0% | 38.0% | 2255 | 5.72 | 1056 | 0.7% | −1.5% | −12.6% | 65 | <0.01 | ○ |
| 68 | 62.0% | 38.0% | 2134 | 5.12 | 1045 | 1.1% | −1.8% | −13.4% | 70 | <0.01 | ○ |
| 69 | 62.0% | 38.0% | 2125 | 4.78 | 785 | 1.2% | −0.7% | −12.9% | 50 | <0.01 | X |
| 70 | 62.0% | 38.0% | 2310 | 5.26 | 1135 | 1.3% | 0.5% | −12.5% | 60 | <0.01 | ○ |
| 71 | 62.0% | 38.0% | 2323 | 6.04 | 1026 | −13.5% | 2.2% | −13.5% | 60 | <0.01 | ○ |
| 72 | 62.0% | 38.0% | 2232 | 5.32 | 1007 | 1.2% | 2.3% | −12.7% | 60 | <0.01 | ○ |

Samples 42 to 72 of Table 5 were obtained by changing the content of respective minor components with respect to the mixed powder of $(1-z)(Ba_{1-x}Ca_x)TiO_3+z(Ba_{1-y}Ca_y)TiO_3$ in which the Ca content (x) in the first base powder was 0 (x=0), the Ca content (y) in the second base powder was 0.075 (y=0.075), and the ratio (z) of the second base powder to the mixed powder was 0.04 (z=0.04), and respective properties of the corresponding samples of Table 5 are shown in Table 6.

Samples 42 to 50 of Table 5 were obtained by changing the content of the rare-earth element (Y) in the third minor component, under the following conditions: the first minor component included variable-valence acceptor elements, Mn and V having a total content of 0.4 mol, the second minor component included Mg having a content of 0 mol, the fourth minor components included Ba and Ca having a total content of 2.2 mol, the fifth minor component included $CaZrO_3$ having a content of 1 mol, the sixth minor component included Si having a content of 1.25 mol, on the basis of 100 mol of the mixed powder of $(1-z)(Ba_{1-x}Ca_x)TiO_3+z(Ba_{1-y}Ca_y)TiO_3$ (x=0, y=0.075, z=0.04); and a (Ba+Ca)/Si ratio between the total content of the fourth minor component (Ba+Ca) and the content of the sixth minor component (Si) was fixed to 1.76, and respective properties of the corresponding samples of Table 5 are shown in Table 6. When the content of the third minor component Y was 0 mol (sample 42), TCC at a high temperature of 150° C. was out of ±15%, and high temperature withstand voltage was less than 50 V/μm, and when the content of the third minor component Y was 5 mol or more, an excessive amount (samples 49 and 50), the high temperature withstand voltage characteristics deteriorated due to the formation of the pyrochlore phase ($Y_2Ti_2O_7$). In particular, the high temperature withstand voltage was maintained to be 50 V/μm or more until the content of the pyrochlore phase was 2% (sample 49). However, when the content of the pyrochlore phase was increased to be 5.0% (sample 50), the high temperature withstand voltage characteristics rapidly deteriorated. Therefore, it can be seen that the content of the third minor component Y is appropriately determined as 0.2 to 5.0 parts by mol, on the basis of 100 parts by mol of the major component.

Samples 51 to 56 of Table 5 were obtained by changing the content of the second minor component Mg, under the following conditions: the first minor component included variable-valence acceptor elements, Mn and V having a total content of 0.4 mol, the third minor component included a rare-earth element Y having a content of 1.5 mol, the fourth minor components included Ba and Ca having a total content of 2.2 mol, the fifth minor component included $CaZrO_3$ having a content of 1 mol, the sixth minor component included Si having a content of 1.25 mol, on the basis of 100 mol of the mixed powder of $(1-z)(Ba_{1-x}Ca_x)TiO_3+z(Ba_{1-y}Ca_y)TiO_3$ (x=0, y=0.075, z=0.04); and a (Ba+Ca)/Si ratio between the total content of the fourth minor components (Ba+Ca) and the content of the sixth minor component (Si) was fixed to 1.76, and respective properties of the corresponding samples of Table 6 are shown in Table 6. As the Mg content was increased, the dielectric constant was decreased while the RC value was concomitantly increased. However, when the Mg content was 3 mol, an excessive amount (sample 56), the dielectric constant was decreased to be less than 1800, and the high temperature withstand voltage was decreased to be less than 50 V/μm. Therefore, it can be seen that the content of the second minor component Mg is appropriately determined as 2.0 parts by mol or less, on the basis of 100 parts by mol of the major component.

Samples 57 to 61 of Table 5 were obtained by changing the content of the fifth minor component $CaZrO_3$ (CZ), and respective properties of the corresponding samples of Table 5 are shown in Table 6. As the CZ content was increased, the dielectric constant and the RC value were increased. However, when the CZ content was 4 mol, an excessive amount (sample 61), TCC at a low temperature of −55° C. was out of ±15%. Therefore, it can be seen that the content of the fifth minor component $CaZrO_3$ (CZ) is appropriately determined as 3.0 parts by mol or less on the basis of 100 parts by mol of the major component.

Samples 62 to 69 of Table 5 were obtained by changing the content of the first minor component Mn, and respective properties of the corresponding samples of Table 5 are shown in Table 6. When the Mn content was 0 mol (sample 62), low reducibility was not secured, and thus, the RC value was significantly low or the high temperature withstand voltage was decreased. As the Mn content was increased, high temperature withstand voltage characteristics were improved without a significant change in TCC (150° C.), and when the Mn content was excessively increased to be 2.5 mol (sample 69), the RC value was decreased. Therefore, it can be seen that the content of the first minor component Mn is appropriately determined as 0.1 to 2.0 parts by mol, on the basis of 100 parts by mol of the major component.

Samples 70 to 72 of Table 5 were obtained by changing ratios between Mn and V when the total content of the first minor component Mn and V was 0.4 mol, and respective properties of the corresponding samples of Table 5 are shown in Table 6. As Mn was partially or entirely changed to V, the RC value was slightly decreased, and the X8R characteristics were satisfactory without significant changes in high temperature withstand voltage and TCC (150° C.). Therefore, the first minor component may include at least one of Mn, V, and transition metal elements such as Cr, Fe, Co, Ni, Cu and Zn which are variable-valence acceptor elements.

TABLE 7

| Sample | First Base Material (Major Component) $(Ba_{1-x}Ca_x)TiO_3$ | | Second Base Material (Major Component) | | Mixing Molar Ratio Between First Base Material (Major Component) and Second Base Material (Major Component) | |
|---|---|---|---|---|---|---|
| | Ba Content 1 − x | Ca Content x | Ba Content 1 − y | Ca Content y | First Base Material (Major component) 1 − z | Second Base Material (Major component) z |
| 73 | 1.000 | 0.000 | 0.925 | 0.075 | 0.600 | 0.400 |
| 74 | 1.000 | 0.000 | 0.925 | 0.075 | 0.600 | 0.400 |
| 75 | 1.000 | 0.000 | 0.925 | 0.075 | 0.600 | 0.400 |
| 76 | 1.000 | 0.000 | 0.925 | 0.075 | 0.600 | 0.400 |
| 77 | 1.000 | 0.000 | 0.925 | 0.075 | 0.600 | 0.400 |
| 78 | 1.000 | 0.000 | 0.925 | 0.075 | 0.600 | 0.400 |
| 79 | 1.000 | 0.000 | 0.925 | 0.075 | 0.600 | 0.400 |
| 80 | 1.000 | 0.000 | 0.925 | 0.075 | 0.600 | 0.400 |
| 81 | 1.000 | 0.000 | 0.925 | 0.075 | 0.600 | 0.400 |
| 82 | 1.000 | 0.000 | 0.925 | 0.075 | 0.600 | 0.400 |
| 83 | 1.000 | 0.000 | 0.925 | 0.075 | 0.600 | 0.400 |
| 84 | 1.000 | 0.000 | 0.925 | 0.075 | 0.600 | 0.400 |
| 85 | 1.000 | 0.000 | 0.925 | 0.075 | 0.600 | 0.400 |
| 86 | 1.000 | 0.000 | 0.925 | 0.075 | 0.600 | 0.400 |
| 87 | 1.000 | 0.000 | 0.925 | 0.075 | 0.600 | 0.400 |
| 88 | 1.000 | 0.000 | 0.925 | 0.075 | 0.600 | 0.400 |
| 89 | 1.000 | 0.000 | 0.925 | 0.075 | 0.600 | 0.400 |
| 90 | 1.000 | 0.000 | 0.925 | 0.075 | 0.600 | 0.400 |
| 91 | 1.000 | 0.000 | 0.925 | 0.075 | 0.600 | 0.400 |
| 92 | 1.000 | 0.000 | 0.925 | 0.075 | 0.600 | 0.400 |
| 93 | 1.000 | 0.000 | 0.925 | 0.075 | 0.600 | 0.400 |
| 94 | 1.000 | 0.000 | 0.925 | 0.075 | 0.600 | 0.400 |
| 95 | 1.000 | 0.000 | 0.925 | 0.075 | 0.600 | 0.400 |
| 96 | 1.000 | 0.000 | 0.925 | 0.075 | 0.600 | 0.400 |
| 97 | 1.000 | 0.000 | 0.925 | 0.075 | 0.600 | 0.400 |
| 98 | 1.000 | 0.000 | 0.925 | 0.075 | 0.600 | 0.400 |

TABLE 7-continued

| | | | | | | |
|---|---|---|---|---|---|---|
| 99 | 1.000 | 0.000 | 0.925 | 0.075 | 0.600 | 0.400 |
| 100 | 1.000 | 0.000 | 0.925 | 0.075 | 0.600 | 0.400 |
| 101 | 1.000 | 0.000 | 0.925 | 0.075 | 0.600 | 0.400 |
| 102 | 1.000 | 0.000 | 0.925 | 0.075 | 0.600 | 0.400 |
| 103 | 1.000 | 0.000 | 0.925 | 0.075 | 0.600 | 0.400 |

| | Number of Moles of Each Additive per 100 mol of Base Material (Major Component) | | | | | | | |
|---|---|---|---|---|---|---|---|---|
| Sample | First Minor Component $MnO_2$ | Second Minor Component $V_2O_5$ | Third Minor Component $MgCO_3$ | Fourth Minor Component $Y_2O_3$ | | Fifth Minor Component $CaZrO_3$ | Sixth Minor Component $SiO_2$ | Additive (Ba + Ca)/ Si Ratio |
| | | | | | $BaCO_3$ $CaCO_3$ | | | |
| 73 | 0.400 | 0.000 | 0.00 | 0.75 | 1.650 0.550 | 1.00 | 1.25 | 1.76 |
| 74 | 0.400 | 0.000 | 0.00 | 0.75 | 1.100 1.100 | 1.00 | 1.25 | 1.76 |
| 75 | 0.400 | 0.000 | 0.00 | 0.75 | 0.550 1.650 | 1.00 | 1.25 | 1.76 |
| 76 | 0.400 | 0.000 | 0.00 | 0.75 | 0.000 2.200 | 1.00 | 1.25 | 1.76 |
| 77 | 0.400 | 0.400 | 0.00 | 0.75 | 1.600 0.000 | 1.00 | 1.25 | 1.28 |
| 78 | 0.400 | 0.400 | 0.00 | 0.75 | 1.800 0.000 | 1.00 | 1.25 | 1.44 |
| 79 | 0.400 | 0.400 | 0.00 | 0.75 | 2.400 0.000 | 1.00 | 1.25 | 1.92 |
| 80 | 0.400 | 0.400 | 0.00 | 0.75 | 2.800 0.000 | 1.00 | 1.25 | 2.25 |
| 81 | 0.400 | 0.400 | 0.00 | 0.75 | 3.200 0.000 | 1.00 | 1.25 | 2.56 |
| 82 | 0.400 | 0.400 | 0.00 | 0.75 | 3.600 0.000 | 1.00 | 1.25 | 2.88 |
| 83 | 0.400 | 0.400 | 0.00 | 0.75 | 0.527 0.000 | 1.00 | 0.30 | 1.76 |
| 84 | 0.400 | 0.400 | 0.00 | 0.75 | 0.600 0.000 | 1.00 | 0.50 | 1.20 |
| 85 | 0.400 | 0.400 | 0.00 | 0.75 | 0.720 0.000 | 1.00 | 0.50 | 1.44 |
| 86 | 0.400 | 0.400 | 0.00 | 0.75 | 0.880 0.000 | 1.00 | 0.50 | 1.76 |
| 87 | 0.400 | 0.400 | 0.00 | 0.75 | 1.280 0.000 | 1.00 | 0.50 | 2.56 |
| 88 | 0.400 | 0.400 | 0.00 | 0.75 | 1.440 0.000 | 1.00 | 0.50 | 2.88 |
| 89 | 0.400 | 0.400 | 0.00 | 0.75 | 1.440 0.000 | 1.00 | 1.00 | 1.44 |
| 90 | 0.400 | 0.400 | 0.00 | 0.75 | 1.760 0.000 | 1.00 | 1.00 | 1.76 |
| 91 | 0.400 | 0.400 | 0.00 | 0.75 | 2.560 0.000 | 1.00 | 1.00 | 2.56 |
| 92 | 0.400 | 0.400 | 0.00 | 0.75 | 2.880 0.000 | 1.00 | 1.00 | 2.88 |
| 93 | 0.400 | 0.400 | 0.00 | 0.75 | 2.400 0.000 | 1.00 | 2.00 | 1.20 |
| 94 | 0.400 | 0.400 | 0.00 | 0.75 | 2.880 0.000 | 1.00 | 2.00 | 1.44 |
| 95 | 0.400 | 0.400 | 0.00 | 0.75 | 3.520 0.000 | 1.00 | 2.00 | 1.76 |
| 96 | 0.400 | 0.400 | 0.00 | 0.75 | 5.120 0.000 | 1.00 | 2.00 | 2.56 |
| 97 | 0.400 | 0.400 | 0.00 | 0.75 | 5.750 0.000 | 1.00 | 2.00 | 2.88 |
| 98 | 0.400 | 0.400 | 0.00 | 0.75 | 3.600 0.000 | 1.00 | 3.00 | 1.20 |
| 99 | 0.400 | 0.400 | 0.00 | 0.75 | 4.320 0.000 | 1.00 | 3.00 | 1.44 |
| 100 | 0.400 | 0.400 | 0.00 | 0.75 | 5.280 0.000 | 1.00 | 3.00 | 1.76 |
| 101 | 0.400 | 0.400 | 0.00 | 0.75 | 7.680 0.000 | 1.00 | 3.00 | 2.56 |
| 102 | 0.400 | 0.400 | 0.00 | 0.75 | 8.640 0.000 | 1.00 | 3.00 | 2.88 |
| 103 | 0.400 | 0.400 | 0.00 | 0.75 | 6.160 0.000 | 1.00 | 3.50 | 1.76 |

TABLE 8

Ni-MLCC Proto-type SPL Properties
(Dielectric Constant/DF Measurement Condition: AC 0.2 V/um, 1 kHz, Room Temperature Specific Resistance: DC 10 V/um)
First Crystal Grain: Ca Content lower than 2.5 mol %, Second Crystal Grain: Ca Content between 2.5 to 13.5 mol %
(By STEM/EDS Analysis)

| Sample | Cross-sectional Area Ratio (%) of First Crystal Grain: 100 − a | Cross-sectional Area Ratio (%) of Second Crystal Grain: a | Room Temperature Dielectric Constant | DF(%) | RC(ΩF) | TCC(%) (−55° C.) | TCC(%) (125° C.) | TCC(%) (150° C.) | High Temperature (150° C.) Withstand Voltage (V/um)* | Ratio of Peak of Pyrochlore ($RE_2Ti_2O_7$) to Peak of $BaTiO_3$ | Properties Evaluation |
|---|---|---|---|---|---|---|---|---|---|---|---|
| 73 | 61.8% | 38.2% | 2254 | 5.23 | 1238 | −8.9% | −2.6% | −13.0% | 60 | <0.01 | ○ |
| 74 | 61.5% | 38.5% | 2201 | 5.12 | 1134 | −8.8% | −2.5% | −13.5% | 60 | <0.01 | ○ |
| 75 | 60.4% | 39.6% | 2275 | 5.15 | 1254 | −8.2% | −2.4% | −13.9% | 60 | <0.01 | ○ |
| 76 | 59.9% | 40.1% | 2238 | 5.08 | 1321 | −8.1% | −2.3% | −13.7% | 60 | <0.01 | ○ |
| 77 | 58.7% | 41.3% | 3356 | 8.59 | 1643 | −1.2% | −5.8% | −20.9% | 40 | <0.01 | X |
| 78 | 60.4% | 39.6% | 2658 | 5.68 | 1255 | −8.5% | −3.0% | −14.6% | 50 | <0.01 | ○ |
| 79 | 62.3% | 37.7% | 2238 | 5.36 | 1054 | −8.9% | −3.7% | −13.5% | 55 | <0.01 | ○ |
| 80 | 61.8% | 38.2% | 2336 | 5.34 | 1125 | −8.5% | −2.5% | −13.7% | 60 | <0.01 | ○ |
| 81 | 62.0% | 38.0% | 2328 | 5.25 | 1082 | −9.3% | −2.3% | −12.9% | 60 | <0.01 | ○ |
| 82 | 60.4% | 39.6% | 2097 | 4.64 | 1234 | −9.2% | −2.3% | −12.8% | 40 | <0.01 | X |
| 83 | 59.8% | 40.2% | 1748 | 3.68 | 1326 | −9.9% | −1.5% | −13.0% | 40 | <0.01 | X |
| 84 | 58.4% | 41.6% | 3654 | 6.68 | 1212 | −9.6% | −1.8% | −18.5% | 35 | <0.01 | X |
| 85 | 60.4% | 39.6% | 2326 | 5.17 | 1174 | −9.7% | −1.2% | −15.0% | 50 | <0.01 | Δ |
| 86 | 61.8% | 38.2% | 2235 | 4.88 | 1024 | −9.3% | −2.5% | −13.9% | 60 | <0.01 | ○ |

TABLE 8-continued

Ni-MLCC Proto-type SPL Properties
(Dielectric Constant/DF Measurement Condition: AC 0.2 V/um, 1 kHz, Room Temperature Specific Resistance: DC 10 V/um)
First Crystal Grain: Ca Content lower than 2.5 mol %, Second Crystal Grain: Ca Content between 2.5 to 13.5 mol %
(By STEM/EDS Analysis)

| Sample | Cross-sectional Area Ratio (%) of First Crystal Grain: 100 − a | Cross-sectional Area Ratio (%) of Second Crystal Grain: a | Room Temperature Dielectric Constant | DF(%) | RC(ΩF) | TCC(%) (−55° C.) | TCC(%) (125° C.) | TCC(%) (150° C.) | High Temperature (150° C.) Withstand Voltage (V/um)* | Ratio of Peak of Pyrochlore ($RE_2Ti_2O_7$) to Peak of $BaTiO_3$ | Properties Evaluation |
|---|---|---|---|---|---|---|---|---|---|---|---|
| 87 | 62.8% | 37.2% | 2207 | 4.78 | 1123 | −9.8% | −2.5% | −13.6% | 55 | <0.01 | ○ |
| 88 | 60.5% | 39.5% | 2187 | 4.44 | 1548 | −8.6% | −1.5% | −12.9% | 45 | <0.01 | X |
| 89 | 60.7% | 39.3% | 2308 | 3.89 | 1174 | −9.5% | −1.4% | −14.2% | 50 | <0.01 | ○ |
| 90 | 59.7% | 40.3% | 2548 | 4.11 | 1005 | −9.9% | −1.7% | −14.5% | 60 | <0.01 | ○ |
| 91 | 58.6% | 41.4% | 2364 | 4.25 | 1143 | −9.1% | −1.5% | −14.6% | 55 | <0.01 | ○ |
| 92 | 59.4% | 40.6% | 2082 | 3.95 | 1245 | −9.2% | −1.2% | −13.5% | 45 | <0.01 | X |
| 93 | 61.5% | 38.5% | 2556 | 4.18 | 1123 | −9.7% | −1.1% | −19.7% | 40 | <0.01 | X |
| 94 | 62.8% | 37.2% | 2361 | 4.88 | 1078 | −9.9% | −1.2% | −11.9% | 50 | <0.01 | ○ |
| 95 | 61.5% | 38.5% | 2165 | 4.65 | 1037 | −10.2% | −1.4% | −11.5% | 60 | <0.01 | ○ |
| 96 | 60.6% | 39.4% | 2156 | 4.84 | 1085 | −10.2% | −1.3% | −12.2% | 60 | <0.01 | ○ |
| 97 | 59.8% | 40.2% | 2985 | 4.62 | 1109 | −10.9% | −0.8% | −11.4% | 45 | <0.01 | X |
| 98 | 60.8% | 39.2% | 3002 | 6.58 | 1034 | −10.3% | −1.7% | −16.4% | 40 | <0.01 | X |
| 99 | 58.4% | 41.6% | 2142 | 4.96 | 1023 | −10.4% | −1.8% | −13.2% | 50 | <0.01 | ○ |
| 100 | 57.6% | 42.4% | 2108 | 5.32 | 1015 | −10.2% | −1.8% | −13.6% | 55 | <0.01 | ○ |
| 101 | 60.8% | 39.2% | 2199 | 5.68 | 1005 | −10.6% | −1.4% | −13.4% | 55 | <0.01 | ○ |
| 102 | 61.8% | 38.2% | 2055 | 5.12 | 893 | −9.5% | −1.9% | −14.0% | 45 | 0.015 | X |
| 103 | 59.2% | 40.8% | 1985 | 5.64 | 933 | −9.5% | −1.6% | −13.8% | 35 | 0.02 | X |

Samples 77 to 103 of Table 7 were obtained by changing the content of respective minor components with respect to the mixed powder of $(1-z)(Ba_{1-x}Ca_x)TiO_3+z(Ba_{1-y}Ca_y)TiO_3$ in which the Ca content (x) in the first base powder was 0 (x=0), the Ca content (y) in the second base powder was 0.075 (y=0.075), and the ratio (z) of the second base powder to the mixed powder was 0.04 (z=0.04), and respective properties of the corresponding samples of Table 7 are shown in Table 8.

Samples 73 to 76 of Table 7 were obtained by partially or entirely changing Ba to Ca in the fourth minor component as compared with the composition of sample 46, and respective properties of the corresponding samples of Table 7 are shown in Table 8. When samples 73 to 76 were compared with sample 46, it can be seen that samples 73 to 76 had almost the same dielectric constant, DF, RC, TCC, and high temperature withstand voltage as those of sample 50. Therefore, the fourth minor component may include at least one of Ba and Ca.

Samples 77 to 82 of Table 7 were obtained by fixing the $SiO_2$ content in the sixth minor component to 1.25 mol and changing the Ba content in the fourth minor component and the (Ba+Ca)/Si ratio as compared with the composition of sample 46, and respective properties of the corresponding samples of Table 7 are shown in Table 8. When the (Ba+Ca)/Si ratio was decreased to be 1.28 (sample 77), the dielectric constant was significantly increased to be 3000 or more, and therefore, TCC (150° C.) deteriorated, and high temperature withstand voltage was decreased to be 40 V/μm. As the Ba content and the (Ba+Ca)/Si ratio were increased, the dielectric constant was decreased and the high temperature withstand voltage was increased. However, when the Ba content and the (Ba+Ca)/Si ratio were excessively increased to be 2.88 (sample 82), the dielectric constant was decreased to be 2097, and the high temperature withstand voltage was decreased to be less than 50 V/μm. Therefore, it can be seen that when the $SiO_2$ content is 1.25 mol, the (Ba+Ca)/Si ratio is appropriately determined as 1.44 to 2.56, and the content of the fourth minor component (Ba+Ca) is appropriately determined as 1.8 to 3.2 mol.

Sample 83 of Table 7 was obtained by fixing the (Ba+Ca)/Si ratio to 1.76, the same as that of the composition of sample 46, and decreasing the (Ba+Ca) content and the Si content to be 0.527 mol and 0.3 mol, respectively, and respective properties of the corresponding sample of Table 7 are shown in Table 8.

In the case in which the Si content was decreased to be 0.3 mol, even when the (Ba+Ca)/Si ratio was included in an appropriate range, the dielectric constant was decreased to be 1748, and the high temperature withstand voltage was also decreased to be 40 V/μm.

Samples 84 to 88 of Table 7 were obtained by changing the Ba content in the fourth minor component and the (Ba+Ca)/Si ratio as compared with the composition of sample 46, when the $SiO_2$ content in the sixth minor component was 0.5 mol, and respective properties of the corresponding samples of Table 7 are shown in Table 8. When the (Ba+Ca)/Si ratio was excessively decreased to be 1.2 (sample 84), or was excessively increased to be 2.88 (sample 88), the high temperature withstand voltage was decreased to be less than 50 V/μm. Therefore, it can be seen that when the $SiO_2$ content is 0.5 mol, the (Ba+Ca)/Si ratio is appropriately determined as 1.44 to 2.56, and the content of the fourth minor component (Ba+Ca) is appropriately determined as 0.72 to 1.28 parts by mol.

Samples 89 to 92, 93 to 97, and 98 to 102 of Table 7 were obtained by fixing the $SiO_2$ content to 1.0 mol, 2.0 mol, and 3.0 mol, respectively, and changing the Ba content and the (Ba+Ca)/Si ratio, and respective properties of the corresponding samples of Table 7 are shown in Table 8. In a case in which the $SiO_2$ content was adjusted to 1.0 mol, 2.0 mol, and 3.0 mol, when the Ba content was adjusted to allow the (Ba+Ca)/Si ratio to be less than 1.44 or more than 2.56 (samples 92, 93, 97, 98 and 102), the high temperature withstand voltage was decreased to be 45 V/μm or less, or TCC (150° C.) was out of ±15%. Therefore, it can be seen that the (Ba+Ca)/Si ratio is appropriately determined as 1.44≤(Ba+Ca)/Si≤2.56.

Sample 103 of Table 7 was obtained by fixing the (Ba+Ca)/Si ratio to 1.76, the same as that of the composition of sample 46, and adjusting the content of (Ba+Ca) and $SiO_2$ to be excessively increased to be 6.16 mol and 3.50 mol, respectively, and respective properties of the corresponding sample of Table 7 are shown in Table 8. In a case in which the Si content was an excessive amount of 3.50, even when the (Ba+Ca)/Si ratio was included in an appropriate range, the dielectric constant was decreased to be 2000 or less, and the formation of the pyrochlore phase, the high temperature withstand voltage was decreased to be less than 50 V/μm.

Therefore, from the results of samples 73 to 103, it can be seen that the content of the fourth minor component (Ba+Ca) is appropriately determined as 0.72 to 7.68 parts by mol and the content of the sixth minor component (Si) is appropriately determined as 0.5 to 3.0 parts by mol, on the basis of 100 parts by mol of the major component, while the (Ba+Ca)/Si ratio satisfies 1.44≤(Ba+Ca)/Si≤2.56.

It can be seen from the results of samples 73 to 103 that samples simultaneously having X8R temperature characteristics, low DF, high RC values, and excellent high temperature withstand voltage characteristics have a fine structure including first crystal grains in which a Ca content is lower than 2.5 mol %, and second crystal grains in which a Ca content is between 2.5 mol % to 13.5 mol %, where the second crystal grains have a cross-sectional area ratio of 30% to 80%, on the basis of 100% of the overall cross-sectional area of the fine structure.

TABLE 9

| Sample | First Base Material (Major Component) $(Ba_{1-x}Ca_x)TiO_3$ | | Second Base Material (Major Component) $(Ba_{1-x}Ca_x)TiO_3$ | | Mixing Molar Ratio Between First Base Material(Major Component) and Second Base Material (Major Component) | |
|---|---|---|---|---|---|---|
| | Ba Content 1 − x | Ca Content x | Ba Content 1 − y | Ca Content y | First Base Material (Major component) 1 − z | Second Base Material (Major component) z |
| 104 | 1.000 | 0.000 | 0.925 | 0.075 | 0.600 | 0.400 |
| 105 | 1.000 | 0.000 | 0.925 | 0.075 | 0.600 | 0.400 |
| 107 | 1.000 | 0.000 | 0.925 | 0.075 | 0.600 | 0.400 |
| 108 | 1.000 | 0.000 | 0.925 | 0.075 | 0.600 | 0.400 |
| 109 | 1.000 | 0.000 | 0.925 | 0.075 | 0.600 | 0.400 |
| 110 | 1.000 | 0.000 | 0.925 | 0.075 | 0.600 | 0.400 |
| 111 | 1.000 | 0.000 | 0.925 | 0.075 | 0.600 | 0.400 |
| 112 | 1.000 | 0.000 | 0.925 | 0.075 | 0.600 | 0.400 |
| 113 | 1.000 | 0.000 | 0.925 | 0.075 | 0.600 | 0.400 |
| 114 | 1.000 | 0.000 | 0.925 | 0.075 | 0.600 | 0.400 |
| 115 | 1.000 | 0.000 | 0.925 | 0.075 | 0.600 | 0.400 |
| 116 | 1.000 | 0.000 | 0.925 | 0.075 | 0.600 | 0.400 |
| 117 | 1.000 | 0.000 | 0.925 | 0.075 | 0.600 | 0.400 |
| 118 | 1.000 | 0.000 | 0.925 | 0.075 | 0.600 | 0.400 |
| 119 | 1.000 | 0.000 | 0.925 | 0.075 | 0.600 | 0.400 |
| 120 | 1.000 | 0.000 | 0.925 | 0.075 | 0.600 | 0.400 |
| 121 | 1.000 | 0.000 | 0.925 | 0.075 | 0.600 | 0.400 |
| 122 | 1.000 | 0.000 | 0.925 | 0.075 | 0.600 | 0.400 |
| 123 | 1.000 | 0.000 | 0.925 | 0.075 | 0.600 | 0.400 |
| 124 | 1.000 | 0.000 | 0.925 | 0.075 | 0.600 | 0.400 |
| 125 | 1.000 | 0.000 | 0.925 | 0.075 | 0.600 | 0.400 |
| 126 | 1.000 | 0.000 | 0.925 | 0.075 | 0.600 | 0.400 |
| 127 | 1.000 | 0.000 | 0.925 | 0.075 | 0.600 | 0.400 |
| 128 | 1.000 | 0.000 | 0.925 | 0.075 | 0.600 | 0.400 |
| 129 | 1.000 | 0.000 | 0.925 | 0.075 | 0.600 | 0.400 |
| 130 | 1.000 | 0.000 | 0.925 | 0.075 | 0.600 | 0.400 |
| 131 | 1.000 | 0.000 | 0.925 | 0.075 | 0.600 | 0.400 |
| 132 | 1.000 | 0.000 | 0.925 | 0.075 | 0.600 | 0.400 |

Number of Moles of Additives Excluding Third Minor Component per 100 mol of Base Material (major component): same as Inventive Example 10
Number of Moles of Third Minor Component per 100 mol of Base Material (major Component)

| Sample | Third Minor Component | | | | | | | |
|---|---|---|---|---|---|---|---|---|
| | $Y_2O_3$ | $Dy_2O_3$ | $Ho_2O_3$ | $Sm_2O_3$ | $Gd_2O_3$ | $Er_2O_3$ | $Tm_2O_3$ | $Yb_2O_3$ |
| 104 | 0.000 | 1.00 | 0.000 | 0.000 | 0.000 | 0.000 | 0.000 | 0.000 |
| 105 | 0.000 | 1.50 | 0.000 | 0.000 | 0.000 | 0.000 | 0.000 | 0.000 |
| 107 | 0.000 | 2.50 | 0.000 | 0.000 | 0.000 | 0.000 | 0.000 | 0.000 |
| 108 | 0.000 | 3.00 | 0.000 | 0.000 | 0.000 | 0.000 | 0.000 | 0.000 |
| 109 | 0.000 | 0.000 | 1.00 | 0.000 | 0.000 | 0.000 | 0.000 | 0.000 |
| 110 | 0.000 | 0.000 | 1.50 | 0.000 | 0.000 | 0.000 | 0.000 | 0.000 |
| 111 | 0.000 | 0.000 | 2.50 | 0.000 | 0.000 | 0.000 | 0.000 | 0.000 |
| 112 | 0.000 | 0.000 | 3.00 | 0.000 | 0.000 | 0.000 | 0.000 | 0.000 |
| 113 | 0.000 | 0.000 | 0.000 | 1.00 | 0.000 | 0.000 | 0.000 | 0.000 |
| 114 | 0.000 | 0.000 | 0.000 | 1.50 | 0.000 | 0.000 | 0.000 | 0.000 |
| 115 | 0.000 | 0.000 | 0.000 | 2.50 | 0.000 | 0.000 | 0.000 | 0.000 |
| 116 | 0.000 | 0.000 | 0.000 | 3.00 | 0.000 | 0.000 | 0.000 | 0.000 |
| 117 | 0.000 | 0.000 | 0.000 | 0.000 | 1.00 | 0.000 | 0.000 | 0.000 |

TABLE 9-continued

| | | | | | | | | |
|---|---|---|---|---|---|---|---|---|
| 118 | 0.000 | 0.000 | 0.000 | 0.000 | 1.50 | 0.000 | 0.000 | 0.000 |
| 119 | 0.000 | 0.000 | 0.000 | 0.000 | 2.50 | 0.000 | 0.000 | 0.000 |
| 120 | 0.000 | 0.000 | 0.000 | 0.000 | 3.00 | 0.000 | 0.000 | 0.000 |
| 121 | 0.000 | 0.000 | 0.000 | 0.000 | 0.000 | 1.00 | 0.000 | 0.000 |
| 122 | 0.000 | 0.000 | 0.000 | 0.000 | 0.000 | 1.50 | 0.000 | 0.000 |
| 123 | 0.000 | 0.000 | 0.000 | 0.000 | 0.000 | 2.50 | 0.000 | 0.000 |
| 124 | 0.000 | 0.000 | 0.000 | 0.000 | 0.000 | 3.00 | 0.000 | 0.000 |
| 125 | 0.000 | 0.000 | 0.000 | 0.000 | 0.000 | 0.000 | 1.00 | 0.000 |
| 126 | 0.000 | 0.000 | 0.000 | 0.000 | 0.000 | 0.000 | 1.50 | 0.000 |
| 127 | 0.000 | 0.000 | 0.000 | 0.000 | 0.000 | 0.000 | 2.50 | 0.000 |
| 128 | 0.000 | 0.000 | 0.000 | 0.000 | 0.000 | 0.000 | 3.00 | 0.000 |
| 129 | 0.000 | 0.000 | 0.000 | 0.000 | 0.000 | 0.000 | 0.000 | 1.00 |
| 130 | 0.000 | 0.000 | 0.000 | 0.000 | 0.000 | 0.000 | 0.000 | 1.50 |
| 131 | 0.000 | 0.000 | 0.000 | 0.000 | 0.000 | 0.000 | 0.000 | 2.50 |
| 132 | 0.000 | 0.000 | 0.000 | 0.000 | 0.000 | 0.000 | 0.000 | 3.00 |

TABLE 10

Ni-MLCC Proto-type SPL Properties
(Dielectric Constant/DF Measurement Condition: AC 0.2 V/um, 1 kHz, Room Temperature Specific Resistance: DC 10 V/um)
First Crystal Grain: Ca Content lower than 2.5 mol %, Second Crystal Grain: Ca Content between 2.5 to 13.5 mol %
(By STEM/EDS Analysis)

| Sample | Cross-sectional Area Ratio (%) of First Crystal Grain (%) 100 − a | Cross-sectional Area Ratio (%) of Second Crystal Grain a | Room Temperature Dielectric Constant | DF(%) | RC(ΩF) | TCC(%) (−55° C.) | TCC(%) (125° C.) | TCC(%) (150° C.) | High Temperature (150° C.) Withstand Voltage (V/um)* | Ratio of Peak of Pyrochlore (RE$_2$Ti$_2$O$_7$) to Peak of BaTiO$_3$ | Properties Evaluation |
|---|---|---|---|---|---|---|---|---|---|---|---|
| 104 | 60.1% | 39.9% | 2258 | 5.59 | 1213 | −9.2% | −1.9% | −12.2% | 75 | <0.01 | ○ |
| 105 | 61.5% | 38.5% | 2346 | 5.55 | 1325 | −9.1% | −1.3% | −13.3% | 65 | <0.01 | ○ |
| 107 | 59.8% | 40.2% | 2254 | 5.65 | 1415 | −7.8% | −1.4% | −14.7% | 60 | 0.015 | Δ |
| 108 | 59.4% | 40.6% | 2176 | 5.24 | 1598 | −7.1% | −0.5% | −13.1% | 45 | 0.03 | X |
| 109 | 60.1% | 39.9% | 2288 | 5.98 | 1113 | −9.4% | −1.8% | −12.5% | 75 | <0.01 | ○ |
| 110 | 61.5% | 38.5% | 2259 | 5.99 | 1238 | −9.2% | −1.4% | −13.6% | 65 | <0.01 | ○ |
| 111 | 59.8% | 40.2% | 2214 | 5.84 | 1367 | −7.7% | −1.2% | −14.5% | 60 | 0.015 | Δ |
| 112 | 59.4% | 40.6% | 1958 | 5.04 | 1542 | −7.5% | −0.9% | −13.3% | 45 | 0.04 | X |
| 113 | 60.1% | 39.9% | 2352 | 5.89 | 1154 | −9.4% | −1.8% | −12.5% | 65 | <0.01 | ○ |
| 114 | 61.5% | 38.5% | 2279 | 5.69 | 1238 | −9.2% | −1.4% | −13.6% | 65 | <0.01 | ○ |
| 115 | 59.8% | 40.2% | 2204 | 5.84 | 1367 | −7.7% | −1.2% | −14.5% | 50 | 0.015 | Δ |
| 116 | 59.4% | 40.6% | 1958 | 5.04 | 1542 | −7.5% | −0.9% | −13.3% | 35 | 0.03 | X |
| 117 | 60.1% | 39.9% | 2125 | 5.98 | 1146 | −9.0% | −1.5% | −13.4% | 60 | <0.01 | ○ |
| 118 | 61.5% | 38.5% | 2189 | 5.74 | 1232 | −9.1% | −1.8% | −13.8% | 60 | <0.01 | ○ |
| 119 | 59.8% | 40.2% | 2225 | 5.85 | 1358 | −7.8% | −1.0% | −14.2% | 55 | 0.015 | Δ |
| 120 | 59.4% | 40.6% | 2032 | 5.64 | 1528 | −7.6% | −1.2% | −13.0% | 35 | 0.03 | X |
| 121 | 60.1% | 39.9% | 2282 | 5.78 | 1233 | −9.2% | 0.8% | −11.8% | 65 | <0.01 | ○ |
| 122 | 61.5% | 38.5% | 2251 | 5.85 | 1322 | −9.8% | 0.5% | −12.5% | 60 | <0.01 | ○ |
| 123 | 59.8% | 40.2% | 2154 | 5.66 | 1427 | −8.2% | 0.2% | −138.0% | 50 | 0.02 | Δ |
| 124 | 59.4% | 40.6% | 2046 | 5.25 | 1628 | −8.5% | 0.7% | −14.5% | 35 | 0.05 | X |
| 125 | 60.1% | 39.9% | 2282 | 5.68 | 1233 | −9.2% | 0.8% | −11.8% | 45 | <0.01 | X |
| 126 | 61.5% | 38.5% | 2281 | 5.65 | 1322 | −9.8% | 0.5% | −12.5% | 35 | 0.015 | X |
| 127 | 59.8% | 40.2% | 2154 | 5.66 | 1427 | −8.2% | 0.2% | −13.8% | 25 | 0.03 | X |
| 128 | 59.4% | 40.6% | 2046 | 5.25 | 1628 | −8.5% | 0.7% | −14.5% | 20 | 0.05 | X |
| 129 | 60.1% | 39.9% | 2266 | 5.77 | 1344 | −10.2% | 1.5% | −8.8% | 40 | <0.01 | X |
| 130 | 61.5% | 38.5% | 2231 | 5.75 | 1427 | −10.5% | 1.2% | −9.5% | 35 | 0.02 | X |
| 131 | 59.8% | 40.2% | 2148 | 5.64 | 1515 | −9.8% | 1.1% | −8.4% | 20 | 0.035 | X |
| 132 | 59.4% | 40.6% | 2054 | 5.15 | 1625 | −9.5% | 1.6% | −7.4% | 15 | 0.06 | X |

Samples 104 to 132 of Table 9 were obtained by changing the third minor component (Y) to other rare-earth elements, and respective properties of the corresponding samples of Table 9 are shown in Table 10. Samples 104 to 108, samples 109 to 112, samples 113 to 116, samples 117 to 120, and samples 121 to 124 were obtained by using Dy, Ho, Sm, Gd, and Er, instead of Y, respectively. It can be seen that when these samples were compared with samples 47 to 50 to which Y is applied, they had almost the same dielectric constant, DF, RC, TCC, and high temperature withstand voltage. Meanwhile, samples 125 to 128 and samples 129 to 132 were obtained by using Tm and Yb instead of Y, respectively. In the XRD analysis of the samples to which Tm or Yb were applied, even when the ratio of the peak of pyrochlore to the peak of BaTiO$_3$ was 0.02 or less, the high temperature withstand voltage was less than 50 V/μm (samples 126 and 130), and as compared with the samples obtained by using Y, Dy, Ho, Sm, Gd or Er under the same content of the corresponding rare-earth element, the ratio of the peak of pyrochlore to the peak of BaTiO$_3$ was relatively high, and the high temperature withstand voltage was significantly decreased. Therefore, it can be seen that the third minor component includes at least one of Y, Dy, Ho, Sm, Gd, Er, La, Ce, Nd, Pr, and Tb excluding Yb and Tm.

As set forth above, according to exemplary embodiments of the present disclosure, there are provided a dielectric ceramic composition satisfying X8R temperature characteristics and having excellent high temperature withstand voltage characteristics, and a dielectric material and a multilayer ceramic capacitor including the same.

While exemplary embodiments have been shown and described above, it will be apparent to those skilled in the art that modifications and variations could be made without departing from the scope of the invention as defined by the appended claims.

What is claimed is:

1. A dielectric ceramic composition comprising:
   a major component (a barium titanate-based base material); and
   a minor component,
   wherein the dielectric ceramic composition is sintered to form a sintered body having a fine structure,
   the fine structure includes first crystal grains in which a Ca content is lower than 2.5 mol % and second crystal grains in which a Ca content is between 2.5 mol % to 13.5 mol %,
   the minor component including at least one selected from the group consisting of oxides and carbonates of at least one of Ba and Ca, and
   the at least one of Ba and Ca included in the fourth minor component has a total content of 0.72 to 7.68 parts by mol on the basis of 100 parts by mol of the major component.

2. The dielectric ceramic composition of claim 1, wherein in an XRD analysis of the sintered body, when a (110) peak of $BaTiO_3$ is set as 1.00, a ratio of a peak of pyrochlore ($RE_2Ti_2O_7$) at about 30.5 degrees with respect to the (110) peak of $BaTiO_3$ satisfies 0.02 or less,
   where RE is at least one of Y, Dy, Ho, Sm, Gd, Er, La, Ce, Nd, Pr, and Tb.

3. The dielectric ceramic composition of claim 1, wherein the major component includes:
   a first major component represented by $(Ba_{1-x}Ca_x)TiO_3$ (x≤0.02); and
   a second major component represented by $(Ba_{1-y}Ca_y)TiO_3$ (0.04≤y≤0.12), and
   when a molar ratio of the first major component is 1-z and a molar ratio of the second major component is z, 0.3≤z≤0.8 is satisfied.

4. The dielectric ceramic composition of claim 1, wherein the minor component includes at least one of the following components:
   a first minor component including at least one selected from the group consisting of oxides and carbonates of at least one of variable-valence acceptor elements including Mn, V, Cr, Fe, Ni, Co, Cu, and Zn;
   a second minor component including at least one selected from the group consisting of oxides and carbonates of a fixed-valence acceptor element including Mg;
   a third minor component including at least one selected from the group consisting of oxides and carbonates of at least one of Y, Dy, Ho, Sm, Gd, Er, La, Ce, Nd, Pr, and Tb;
   a fourth minor component including $CaZrO_3$; and
   a fifth minor component including at least one selected from the group consisting of oxides and carbonates of Si, and glass including Si.

5. The dielectric ceramic composition of claim 4, wherein the minor component includes the first minor component including at least one selected from the group consisting of oxides and carbonates of at least one of variable-valence acceptor elements including Mn, V, Cr, Fe, Ni, Co, Cu, and Zn, and
   the at least one of variable-valence acceptor elements of Mn, V, Cr, Fe, Ni, Co, Cu, and Zn included in the first minor component has a total content of 0.1 to 2.0 parts by mol on the basis of 100 parts by mol of the major component.

6. The dielectric ceramic composition of claim 4, wherein the minor component includes the second minor component including at least one selected from the group consisting of oxides and carbonates of a fixed-valence acceptor element including Mg, and
   the fixed-valence acceptor element including Mg included in the second minor component has a content of 2.0 parts by mol or less on the basis of 100 parts by mol of the major component.

7. The dielectric ceramic composition of claim 4, wherein the minor component includes the third minor component including at least one selected from the group consisting of oxides and carbonates of at least one of Y, Dy, Ho, Sm, Gd, Er, La, Ce, Nd, Pr, and Tb, and
   the at least one of Y, Dy, Ho, Sm, Gd, Er, La, Ce, Nd, Pr, and Tb included in the third minor component has a total content of 0.2 to 5.0 parts by mol on the basis of 100 parts by mol of the major component.

8. The dielectric ceramic composition of claim 4, wherein the minor component includes the fourth minor component including $CaZrO_3$, and
   $CaZrO_3$ has a content of 3 parts by mol or less on the basis of 100 parts by mol of the major component.

9. The dielectric ceramic composition of claim 4, wherein the minor component includes the fifth minor component including at least one selected from the group consisting of oxides and carbonates of Si, and glass including Si, and
   Si included in the sixth minor component has a content of 0.5 to 3.0 parts by mol on the basis of 100 parts by mol of the major component.

10. The dielectric ceramic composition of claim 4, wherein the minor component includes:
    the fifth minor component including at least one selected from the group consisting of oxides and carbonates of Si, and glass including Si, and
    when a total content of the at least one of Ba and Ca included in the fourth minor component is x and a content of Si included in the fifth minor component is y, x/y satisfies 1.44 to 2.56.

11. A dielectric material obtained by sintering the dielectric ceramic composition of claim 1.

12. A multilayer ceramic capacitor comprising:
    a ceramic body in which dielectric layers and internal electrodes are alternately stacked; and
    external electrodes provided on external surfaces of the ceramic body and electrically connected to the internal electrodes,
    wherein the dielectric layers have a fine structure including first crystal grains in which a Ca content is lower than 2.5 mol % and second crystal grains in which a Ca content is between 2.5 mol % to 13.5 mol %,
    the minor component including at least one selected from the group consisting of oxides and carbonates of at least one of Ba and Ca, and
    the at least one of Ba and Ca included in the fourth minor component has a total content of 0.72 to 7.68 parts by mol on the basis of 100 parts by mol of the major component.

13. The multilayer ceramic capacitor of claim 12, wherein in an XRD analysis of the dielectric layer, when a (110) peak of $BaTiO_3$ is set as 1.00, a ratio of a peak of pyrochlore ($RE_2Ti_2O_7$) at about 30.5 degrees with respect to the (110) peak of $BaTiO_3$ satisfies 0.02 or less, where RE is at least one of Y, Dy, Ho, Sm, Gd, Er, La, Ce, Nd, Pr, and Tb.

14. The multilayer ceramic capacitor of claim 12, wherein the dielectric layer is formed of a dielectric ceramic composition including a major component (a barium titanate-based base material) and a minor component, the major component includes a first major component represented by $(Ba_{1-x}Ca_x)TiO_3$ (x≤0.02), and a second major component represented by $(Ba_{1-y}Ca_y)TiO_3$ (0.04≤y≤0.12), and when a molar ratio of the first major component is 1-z and a molar ratio of the second major component is z, 0.3≤z≤0.8 is satisfied.

15. The multilayer ceramic capacitor of claim 12, wherein the dielectric layer is formed of a dielectric ceramic composition including a major component (a barium titanate-based base material) and a minor component, and the minor component includes at least one of the following components:
a first minor component including at least one selected from the group consisting of oxides and carbonates of at least one of variable-valence acceptor elements including Mn, V, Cr, Fe, Ni, Co, Cu, and Zn;
a second minor component including at least one selected from the group consisting of oxides and carbonates of a fixed-valence acceptor element including Mg;
a third minor component including at least one selected from the group consisting of oxides and carbonates of at least one of Y, Dy, Ho, Sm, Gd, Er, La, Ce, Nd, Pr, and Tb;
a fourth minor component including $CaZrO_3$; and
a fifth minor component including at least one selected from the group consisting of oxides and carbonates of Si, and glass including Si.

16. The multilayer ceramic capacitor of claim 15, wherein the minor component includes the first minor component including at least one selected from the group consisting of oxides and carbonates of at least one of variable-valence acceptor elements including Mn, V, Cr, Fe, Ni, Co, Cu, and Zn, and the at least one of variable-valence acceptor elements of Mn, V, Cr, Fe, Ni, Co, Cu, and Zn included in the first minor component has a total content of 0.1 to 2.0 parts by mol on the basis of 100 parts by mol of the major component.

17. The multilayer ceramic capacitor of claim 15, wherein the minor component includes the second minor component including at least one selected from the group consisting of oxides and carbonates of a fixed-valence acceptor element including Mg, and the fixed-valence acceptor element including Mg included in the second minor component has a content of 2.0 parts by mol or less on the basis of 100 parts by mol of the major component.

18. The multilayer ceramic capacitor of claim 15, wherein the minor component includes the third minor component including at least one selected from the group consisting of oxides and carbonates of at least one of Y, Dy, Ho, Sm, Gd, Er, La, Ce, Nd, Pr, and Tb, and the at least one of Y, Dy, Ho, Sm, Gd, Er, La, Ce, Nd, Pr, and Tb included in the third minor component has a total content of 0.2 to 5.0 parts by mol on the basis of 100 parts by mol of the major component.

19. The multilayer ceramic capacitor of claim 15, wherein the minor component includes the fourth minor component including $CaZrO_3$, and $CaZrO_3$ has a content of 3 parts by mol or less on the basis of 100 parts by mol of the major component.

20. The multilayer ceramic capacitor of claim 15, wherein the minor component includes the fifth minor component including at least one selected from the group consisting of oxides and carbonates of Si, and glass including Si, and Si included in the fifth minor component has a content of 0.5 to 3.0 parts by mol on the basis of 100 parts by mol of the major component.

21. The multilayer ceramic capacitor of claim 15, wherein the minor component includes:
the fifth minor component including at least one selected from the group consisting of oxides and carbonates of Si, and glass including Si, and
when a total content of the at least one of Ba and Ca included in the minor component is x and a content of Si included in the sixth minor component is y, x/y satisfies 1.44 to 2.56.

* * * * *